US005754832A

United States Patent [19]
Sasaki

[11] Patent Number: 5,754,832
[45] Date of Patent: May 19, 1998

[54] ELECTRONIC FILING APPARATUS FOR PRINTING SPLIT AND PARTITIONED IMAGES IN ACCORDANCE WITH A PARTITION LINE HAVING ARBITRARY LINE SEGMENTS IN AN ARBITRARY CONFIGURATION

[75] Inventor: Kenji Sasaki, Yokohama, Japan

[73] Assignee: Ricoh Company, Ltd., Tokyo, Japan

[21] Appl. No.: 521,590

[22] Filed: Aug. 30, 1995

[30] Foreign Application Priority Data

Sep. 2, 1994 [JP] Japan .................. 6-209543

[51] Int. Cl.[6] ........................... G06T 1/00
[52] U.S. Cl. ............... 395/787; 395/779; 382/173; 382/175
[58] Field of Search .................. 382/173, 175, 382/177; 395/148, 117, 779, 782-3, 787, 788-9

[56] References Cited

U.S. PATENT DOCUMENTS

| | | | |
|---|---|---|---|
| 4,129,858 | 12/1978 | Hara | 345/180 |
| 5,052,835 | 10/1991 | Takahashi | 395/117 |
| 5,123,758 | 6/1992 | Uematsu | 395/117 |
| 5,379,372 | 1/1995 | Wu | 395/148 |
| 5,432,614 | 7/1995 | Yamamoto | 395/116 |

OTHER PUBLICATIONS

Douglas Cobb, *Excel in Business*, Microsoft Press pp. 314–319, 1985.

*Primary Examiner*—Joseph H. Feild
*Assistant Examiner*—Jae-Hee Choi
*Attorney, Agent, or Firm*—Oblon, Spivak, McClelland, Maier & Neustadt, P.C.

[57] ABSTRACT

An electronic filing apparatus includes a reading unit which reads an image of a document, a storage unit which stores the read image, a display unit which displays the stored image, and a printing unit which prints the displayed image on a recording sheet. The apparatus further includes a line setting unit which sets a partition line within the displayed image in accordance with input data when the displayed image is greater in size than the recording sheet, a generating unit which generates split images by splitting the displayed image in accordance with the partition line to make each of the split images smaller in size than the recording sheet, and a print control unit which controls the printing unit to print each of the generated split images on the recording sheet.

11 Claims, 34 Drawing Sheets

ELECTRONIC FILING APPARATUS FOR
PRINTING SPLIT AND PARTITIONED
IMAGES IN ACCORDANCE WITH A
PARTITION LINE HAVING ARBITRARY
LINE SEGMENTS IN AN ARBITRARY
CONFIGURATION

BACKGROUND OF THE INVENTION

The present invention relates to an electronic filing apparatus in which images of documents are stored in a storage unit, and any of the images read from the storage unit are displayed on a display unit and printed on recording sheets (e.g., A3 or A4 size sheets) for information retrieval.

A conventional electronic filing apparatus experiences a problem that a displayed image cannot correctly be printed on a recording sheet if the displayed image is greater in size (e.g., A3 size sheet) than the recording sheet (e.g., A4 size sheet).

In order to resolve this problem, it is necessary to carry out one of the following methods:

(1) the image of the document be reduced to a size substantially equal to the size of the recording sheet, and the reduced image be printed;

(2) a portion of the image of the document is erased or moved to another location of the image by using an editing function, so that the edited image is included within the range of the recording sheet.

FIG. 1 shows an image of an A3-size document. In order to print the image of the A3-size document in FIG. 1 on an A4-size recording sheet, it is necessary that this image is split by a straight line "LO" into two parts.

FIG. 2A shows an upper half of the original image which is produced by the above splitting procedure, and FIG. 2B shows a lower half of the original image which is produced by the above splitting procedure. Each of the split images in FIGS. 2A and 2B can correctly be printed on an A4-sized recording sheet.

However, in a case of the above item (1), a character image may be illegible and a photographic image may contain a moire or some other defect if the reduction of the image is performed and the reduced image is printed. The quality of the reduced image will be degraded from the quality of the original image.

In a case of the above item (2), it is necessary that the electronic filing apparatus is capable of using the editing function. Some other electronic filing devices which have no editing function cannot correctly print an image on a recording sheet if the displayed image is greater in size than the recording sheet. Even when the electronic filing apparatus is capable of using the editing function, editing operations such as erasing and image moving which are time consuming and mostly complicated must be performed.

There is another problem which the conventional apparatus will experience. When the contents of a displayed image are not easily split by a straight line, it is difficult to correctly print the displayed image on a recording sheet the size of which is smaller than the size of the displayed image. If the above splitting method using the straight line is performed, a split image with redundant portions or erased portions will be printed on the recording sheet due to the straight-line separation.

SUMMARY OF THE INVENTION

An object of the present invention to provide an improved electronic filing apparatus in which the above-described problems are eliminated.

Another object of the present invention is to provide an electronic filing apparatus which correctly prints an image of a document onto a recording sheet even when the image is greater in size than the recording sheet.

Still another object of the present invention is to provide an electronic filing apparatus which facilitates the information retrieval of the images of documents stored in the electronic filing apparatus.

The above-mentioned objects of the present invention are achieved by an electronic filing apparatus which includes: a reading unit for reading an image of a document; a storage unit for storing the image read by the reading unit; a display unit for displaying the image stored in the storage unit; a printing unit for printing the image displayed by the displaying unit on a recording sheet; a line setting unit for setting a partition line within the displayed image in accordance with input data when the displayed image is greater in size than the recording sheet; a generating unit for generating split images by splitting the displayed image in accordance with the partition line set by the line setting unit to make each of the split images smaller in size than the recording sheet; and a print control unit for controlling the printing unit to print each of the split images generated by the generating unit on the recording sheet.

In the electronic filing apparatus according to the present invention, when a displayed image is greater in size than the recording sheet, it is possible to set a partition line having line segments in an arbitrary configuration. The displayed image can be split into split images in accordance with the partition line, and each of the split images can be printed on the recording sheet. Thus, it is possible to realize the information retrieval without degrading the quality of the original image.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of an electronic filing apparatus in one embodiment of the present invention.

Figure 1:
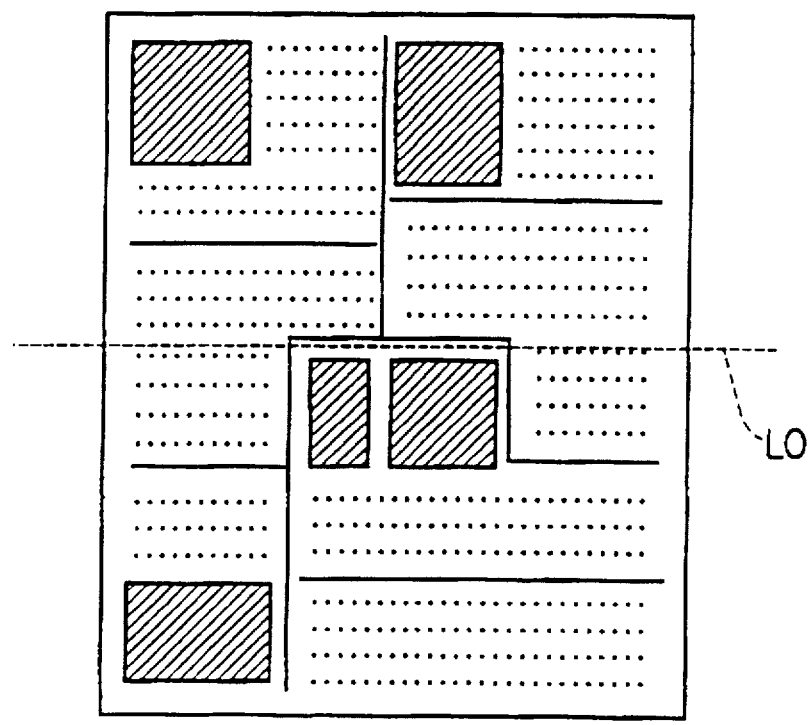
FIG. 1 is a diagram showing an image of a document stored in a conventional filing apparatus.
Figure 2A:
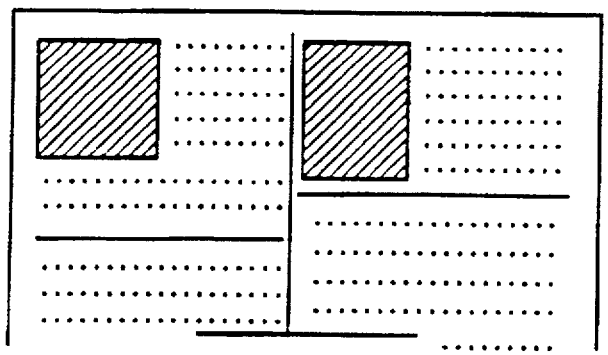
FIGS. 2A and 2B are diagrams showing split images of the image in FIG. 1, which are separately printed by the conventional filing apparatus.
Figure 2B:
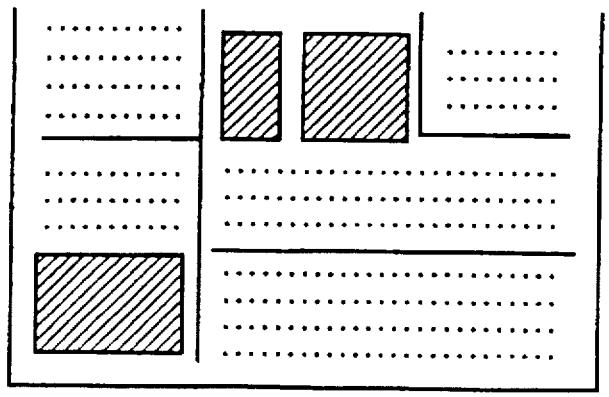
Figure 3:
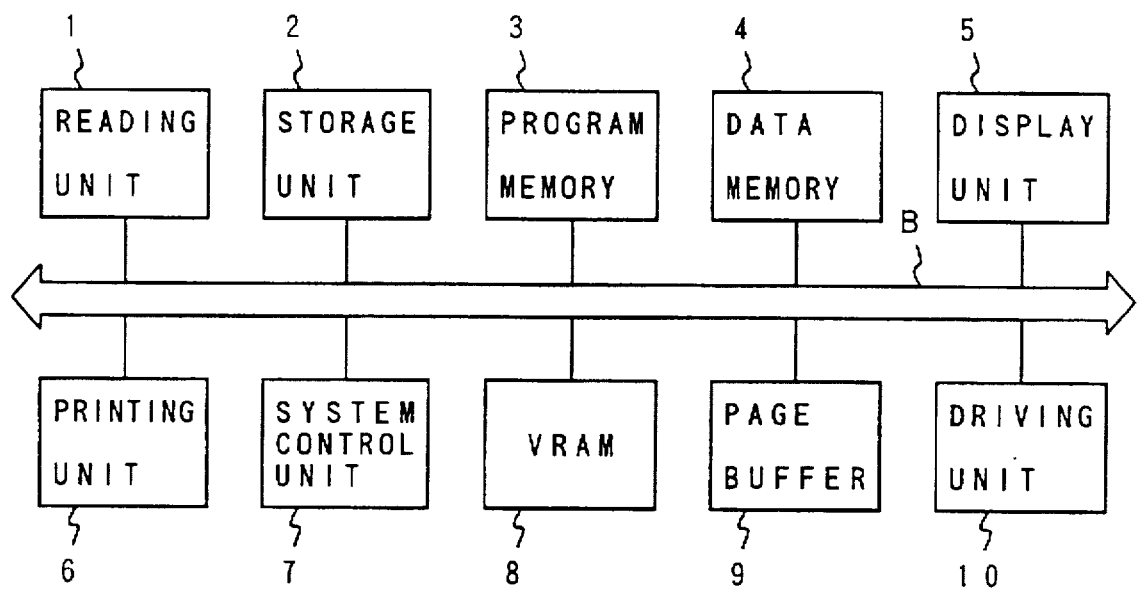
FIG. 3 is a block diagram of an electronic filing apparatus in one embodiment of the present invention.

FIG. 3 shows the electronic filing apparatus in this embodiment. This electronic filing apparatus comprises a reading unit 1, a storage unit 2, a program memory 3, a data memory 4, a display unit 5, a printing unit 6, a central processing unit (CPU) 7, a video RAM (VRAM) 8, a page buffer 9, and a driving unit 10. These components of the electronic filing apparatus are interconnected by a bus B as shown in FIG. 3.

The reading unit 1 includes input devices, such as a keyboard and a mouse, for inputting data related to various operations, and a scanner for reading an image of a document. The storage unit 2 includes a storage medium for storing a large amount of data of images of documents. The storage medium is any of magnetic disks (floppy disks, hard disks, head disks), magneto-optical disks, optical disks, microfilms, and internal head disks.

The program memory 3 is a memory for storing programs which execute various processing procedures of the electronic filing apparatus are stored. The data memory 4 is a memory for storing data and programs used to execute various processing procedures of the electronic filing apparatus.

The display unit 5 is a display device, such as a CRT (cathode ray tube) display and a LCD (liquid crystal display), on which any images of the documents and any operational messages are displayed. The printing unit 6 is a laser beam printer which prints an image of a document on a recording sheet.

The system control unit 7 includes a microcomputer comprised of a CPU (central processing unit), a ROM (read-only memory), and a RAM (random access memory). The system control unit 7 controls operations of the whole electronic filing apparatus, and carries out a split image generating process in which an image of a document is split into split images in accordance with the size of the recording sheet, and each of the split images is printed on a recording sheet.

The VRAM 8 is a memory for storing image data, and the stored image data is displayed on the display unit 5. The page buffer 9 is a memory for storing image data in terms of page. This page buffer 9 is used to generate a split image from an original image, and the generated split image is stored in this page buffer 9.

The driving unit 10 controls the storage unit 2 to allow the writing and reading of image data to and from the storage unit 2.

The bus B interconnects the above components of the electronic filing apparatus, and it is a data path through which image data from one component is sent to or received by another.

Figure 4:
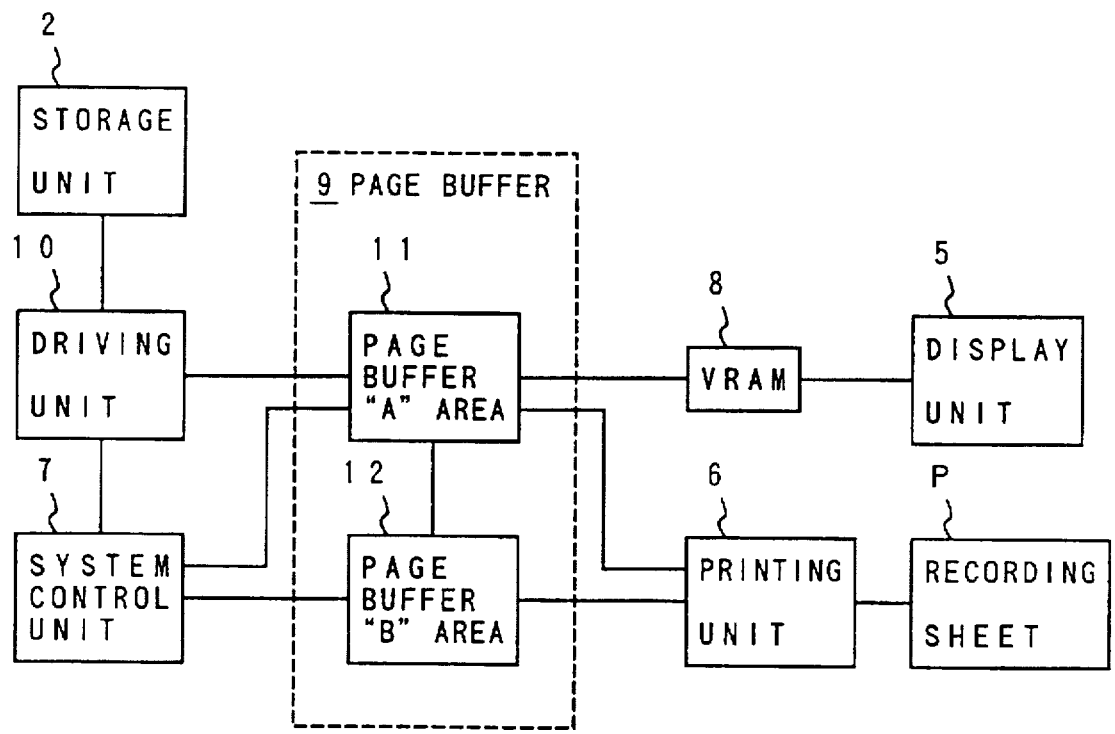
FIG. 4 is a block diagram of a main part of the electronic filing apparatus in FIG. 3.

FIG. 4 shows a main part of the electronic filing apparatus in one embodiment of the present invention. In FIG. 4, the page buffer 7 includes a page buffer "A" area 11 and a page buffer "B" area 12.

The page buffer "A" area 11 is a memory in which image data read from the storage unit 2 by the driving unit 10 is stored. The image data in terms of page is stored in the page buffer "A" area 11. The page buffer "B" area 12 is a memory in which image data of split images generated by the split image generating process is stored.

In the electronic filing apparatus, the image data stored in the page buffer "A" area 11 is processed through one of various editing functions, or processed through the split image generating process. The page buffer "B" area 12 is used as the work area when such a processing is performed, and the processed image data or the split image data is stored in the page buffer "B" area 12.

As shown in FIG. 4, under the control of the system control unit 7, image data is read from the storage unit 2 through the driving unit 10, and the read image data is stored in the page buffer "A" area 11.

The image data stored in the page buffer "A" area 11 is transferred to the VRAM 8, and the image data stored in the VRAM 8 is displayed on the display unit 5. Also, an image indicated by the image data stored in the page buffer "A" area 11 is printed on a recording sheet P by the printing unit 6.

When an image stored in the page buffer "A" area 11 is printed, there is a case in which the stored image is greater in size than the recording sheet P. In this case, under the control of the system control unit 7, the stored image is divided into split images in accordance with a partition line, and each of the split images is stored in the page buffer "B" area 12. The split images stored in the page buffer "B" area 12 are sequentially printed on the recording sheets P.

Accordingly, in the electronic filing apparatus of the present invention, the reading unit 1 reads an image of a document from the storage unit 2. The page buffer 9 stores the image read by the reading unit 1. The display unit 5 displays the image stored in the page buffer 9. The printing unit 6 prints the image, stored in the page buffer 9 and displayed on the display unit 5, on a recording sheet. The system control unit 7 sets a partition line in accordance with input data of line segments of the partition line within the displayed image when the displayed image is greater in size than the recording sheet. The system control unit 7 generates split images by splitting the displayed image in accordance with the partition line to make each of the split images smaller in size than the recording sheet. The system control unit 7 controls the printing unit 6 to print each of the generated split images on the recording sheet.

Next, a description will be given of a generation of split images from an original displayed image on the electronic filing apparatus according to the present invention.

Figure 5:
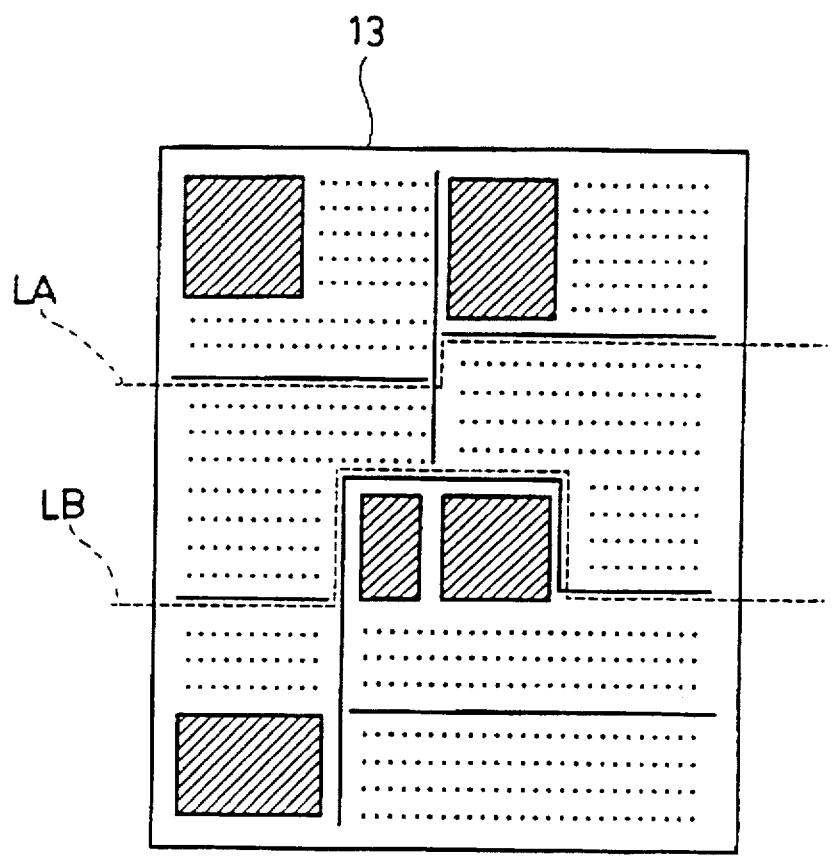
FIG. 5 is a diagram showing an original displayed image which is split by the electronic filing apparatus.
Figure 6A:
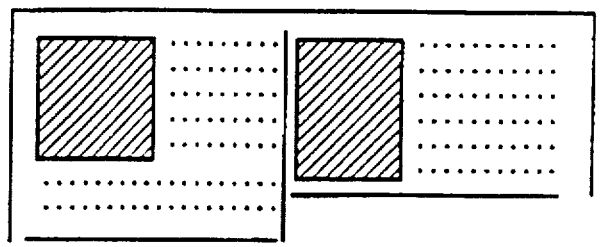
FIGS. 6A, 6B, and 6C are diagrams showing split images which are generated from the original image in FIG. 5.
Figure 6B:
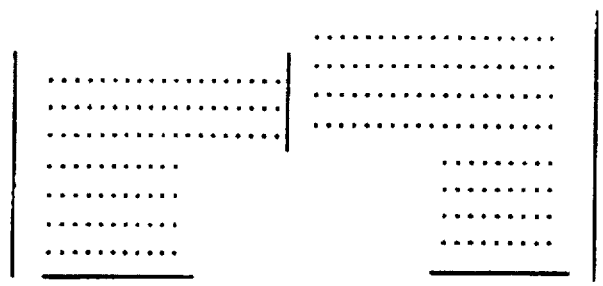
Figure 6C:
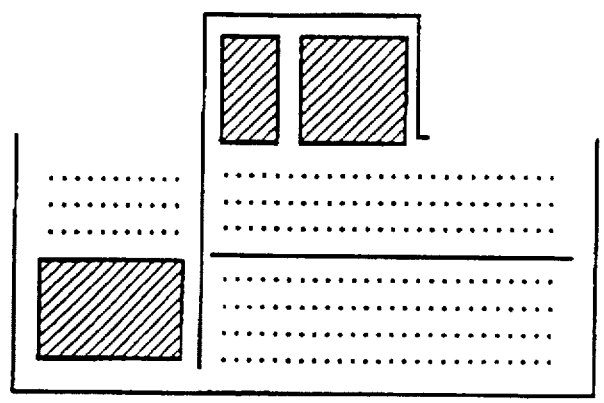

FIG. 5 shows an original displayed image 13 which is split by the electronic filing apparatus. FIGS. 6A, 6B, and 6C show split images which are generated from the original image in FIG. 5. For the sake of convenience, a description will be given of a case in which an original displayed image having the A3 size is split into split images each having the A4 size.

First, the operator on the electronic filing apparatus sets a partition line so that splitting positions at which the original image is split are specified in accordance with the contents of the original image. In FIG. 5, the operator sets two partition lines LA and LB for splitting the original image 13. The original image 13 has the A3 size. The splitting positions based on the input partition lines LA and LB are designated. The three split images which are generated from the original image 13 by the partition lines LA and LB are shown in FIGS. 6A, 6B, and 6C. Each of these split images can be printed on an A4-size recording sheet.

As the operator can set a partition line having line segments in an arbitrary configuration, it is possible to easily and freely split the original image by the partition line in accordance with the contents of the original image. The partition line input operation can be easily performed, and each of the split images can be printed on a recording sheet. The electronic filing apparatus according to the present invention provides printed sheets of the split images, and it facilitates the information retrieval.

Figure 7:
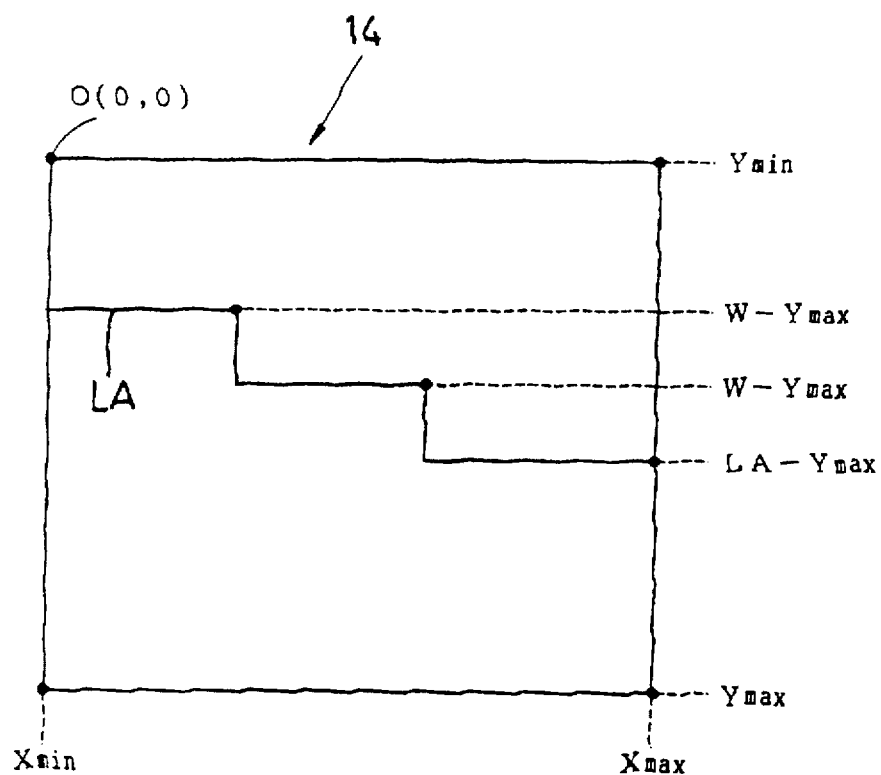
FIG. 7 is a diagram for explaining parameters which are set when generating a split image.
Figure 8:
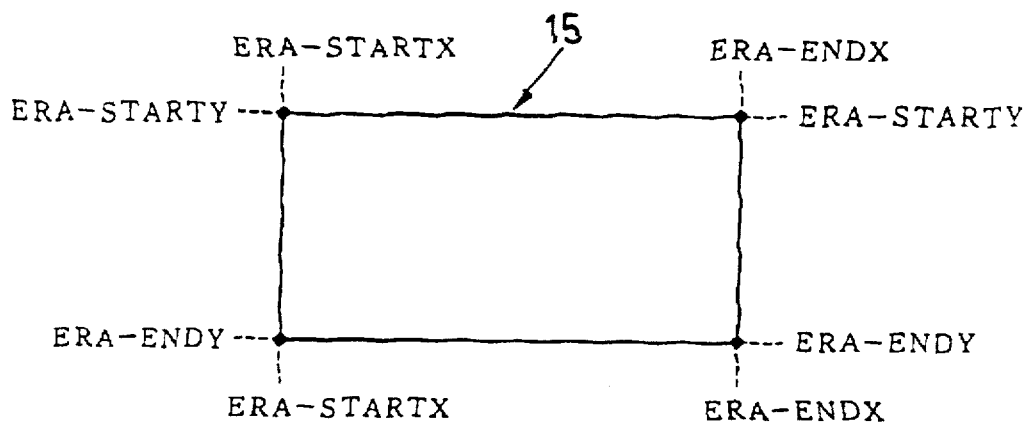
FIG. 8 is a diagram for explaining parameters which are set when generating an image having an erased portion.

FIG. 7 shows parameters which are set when generating a split image from the original image. FIG. 8 shows parameters which are set when generating a split image having an erased portion.

In FIG. 7, an upper left corner of an image 14 of a document is indicated by the origin O (0, 0), and a minimum x coordinate (the leftmost position) and a minimum y coordinate (the uppermost position) of the image 14 are indicated by "Xmin" and "Ymin". In the case of FIG. 7, the "Xmin" and "Ymin" are both equal to 0 in the coordinate system. A maximum x coordinate (the rightmost position) and a maximum y coordinate (the lowermost position) of the image 14 are indicated by "Xmax" and "Ymax".

Also, in FIG. 7, a partition line LA having line segments is shown, and a maximum y coordinate of the partition line LA is indicated by "LA–Ymax". Each of y coordinates of intermediate points of the partition line LA is indicated by "W–Ymax". The operator sets these intermediate points of the partition line LA. The electronic filing apparatus reads x and y coordinates of the intermediate points, and uses them to determine the splitting positions for generating a split image from the original image, and uses them to determine an erased portion in a split image.

In FIG. 8, x and y coordinates of a start point (the upper left corner) of an erased portion 15 are indicated by "ERA-STARTX" and "ERA-STARTY", and x and y coordinates of an end point (the lower right corner) of the erased portion 15 are indicated by "ERA-ENDX" and "ERA-ENDY".

Next, a description will be given of operations of the electronic filing apparatus to generate split images from an original image. FIGS. 9 through 37 show such operations of the electronic filing apparatus.

Figure 9:
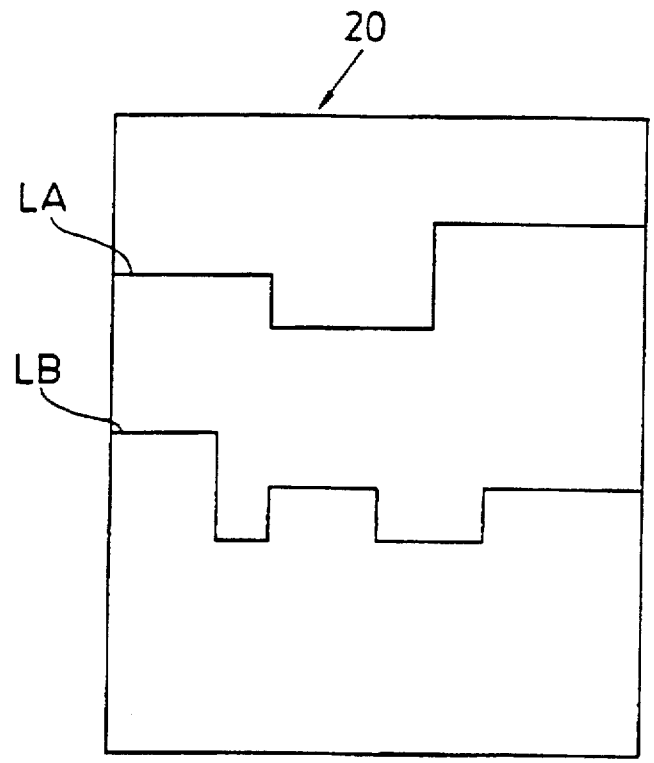
FIGS. 9 through 37 are diagrams for explaining operations of the electronic filing apparatus to generate split images from the original image.

FIG. 9 shows an original displayed image 20 having the A3 size. The original image 20 is stored in the page buffer "A" area 11, and it is displayed on the display unit 5.

In order to correctly print the split images, generated from the original image in FIG. 9, on the recording sheets having the A4 size, the operator sets two partition lines LA and LB by which the original image 20 is split into three split images, as shown in FIG. 9. Hereinafter, the split images are respectively called a first split-image, a subsequent split-image, and a final split-image.

Figure 10:
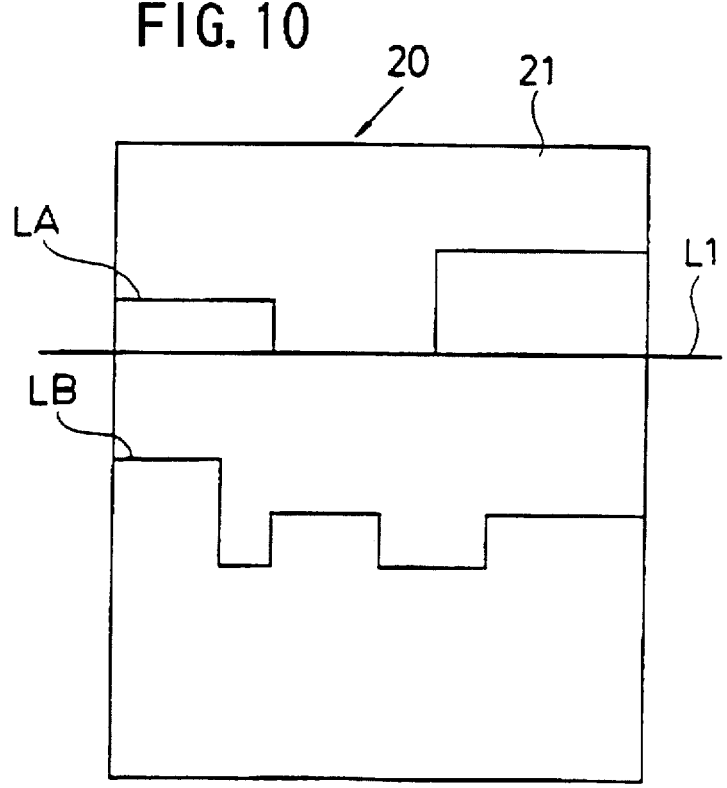

The first split-image will be first generated from the original image 20. As shown in FIG. 10, a partition reference line L1 is determined based on the partition line LA, and the partition reference line L1 is used to generate the first split-image. This partition reference line L1 is a straight line which is determined by the maximum y coordinate "LA–Ymax" of the splitting positions of the partition line LA. The electronic filing apparatus separates an upper image portion 21 from the original image 20 by the partition reference line L1, and transfers the data of the separated upper image portion 21 into the page buffer "B" area 12.

The electronic filing apparatus determines erased portions in the upper image portion 21, the erased portions being bounded by the partition line LA and the partition reference line L1. The data of the erased portions will be eliminated from the data of the separated upper image portion 21.

Figure 11:
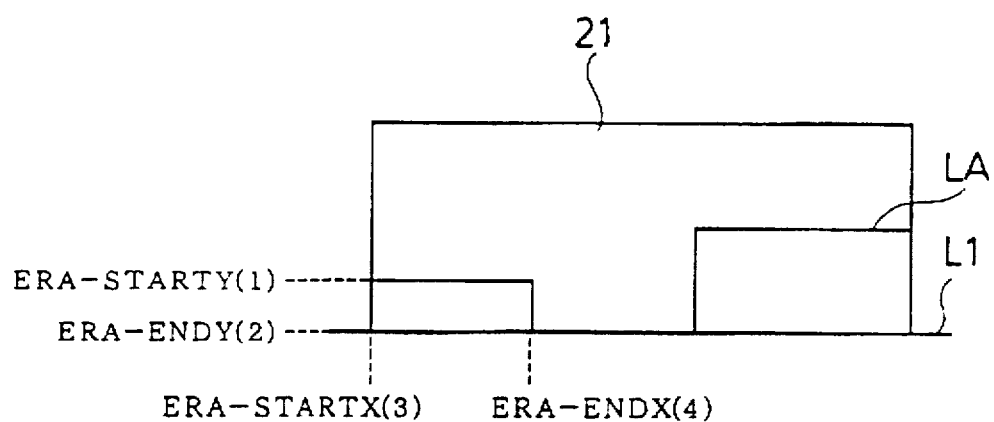

More specifically, as shown in FIG. 11, a second greatest y coordinate of the intermediate points of the partition line LA (which has been set by the operator) is determined by the electronic filing apparatus. A y coordinate ERA-STARTY (1) of a start point (the upper left corner) of one of the erased portions is set in the value of this second greatest y coordinate. A y coordinate ERA-ENDY (2) of an end point (the lower right corner) of the erased portion is set in the value of the y coordinate "LA–Ymax" of the partition reference line L1. An x coordinate ERA-STARTX (3) of the start point of the erased portion is set. An x coordinate ERA-ENDX (4) of the end point of the erased portion is set.

Figure 12:
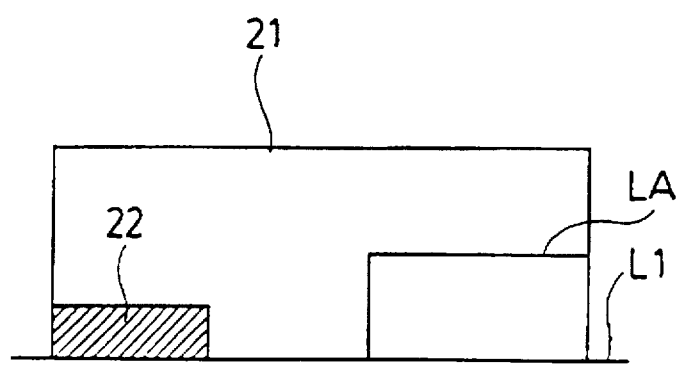

As shown in FIG. 12, the x and y coordinates of the start and end points of the erased portion 22 are thus determined, and the electronic filing apparatus eliminates the data of the erased portion 22 (the shaded area) from the data of the upper image portion 21.

Figure 13:
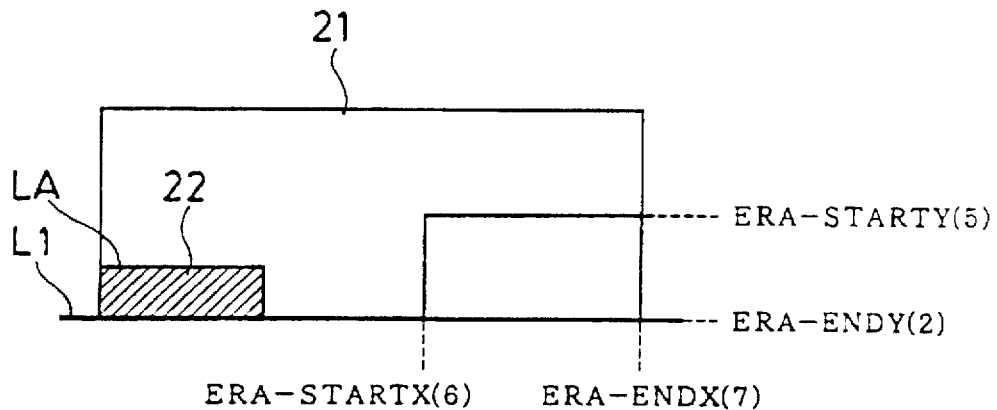

Further, as shown in FIG. 13, a third greatest y coordinate of the intermediate points of the partition line LA is determined by the electronic filing apparatus. A y coordinate ERA-STARTY (5) of a start point (the upper left corner) of the other of the erased portions is set in the value of this third greatest y coordinate. A y coordinate ERA-ENDY (2) of an end point (the lower right corner) of this erased portion is set in the value of the y coordinate "LA–Ymax" of the partition reference line L1. An x coordinate ERA-STARTX (6) of the start point of the erased portion is set. An x coordinate ERA-ENDX (7) of the end point of the erased portion is set.

Figure 14:
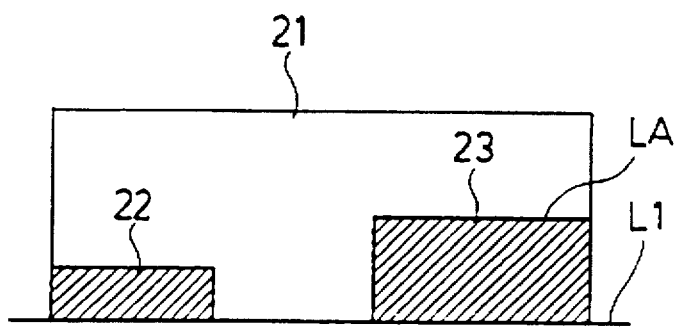

As shown in FIG. 14, the x and y coordinates of the start and end points of the erased portion 23 are thus determined, and the electronic filing apparatus eliminates the data of the erased portion 23 (the shaded area) from the data of the upper image portion 21.

Figure 15:
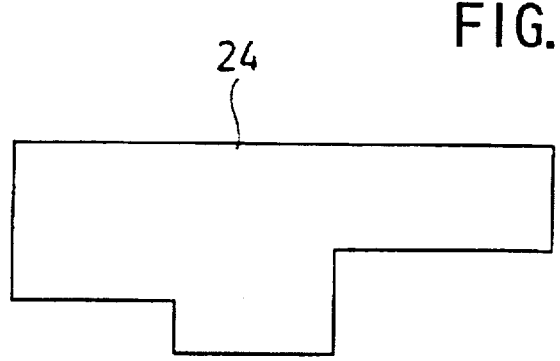

Accordingly, as shown in FIG. 15, the first split-image 24 in which the data of the erased portions 22 and 23, each of which is bounded by the partition line and the partition reference line, are eliminated from the upper image portion 21 is generated. This first split-image 24 is printed on the recording sheet having the A4 size by the electronic filing apparatus.

Next, the subsequent split-image will be generated from the original image 20.

Figure 16:
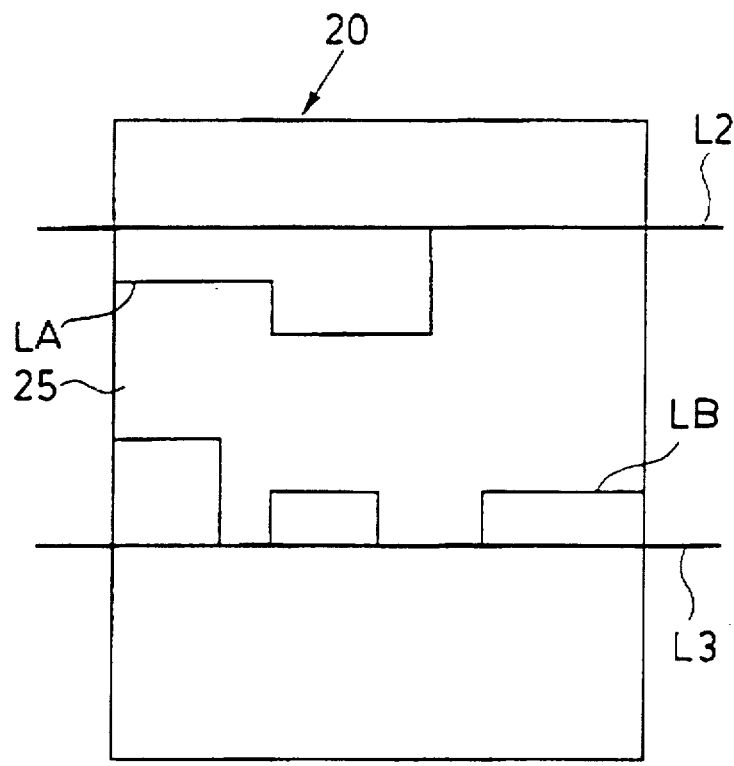

As shown in FIG. 16, partition reference lines L2 and L3 are determined based on the partition lines LA and LB, and the partition reference lines L2 and L3 are used to generate the subsequent split-image.

The determined partition reference line L2 is a straight line which is determined by the minimum y coordinate of the splitting positions of the partition line LA. Also, the determined partition reference line L3 is a straight line which is determined by the maximum y coordinate of the splitting positions of the partition line LB.

The electronic filing apparatus separates an intermediate image portion 25 from the original image 20 by the partition reference lines L2 and L3, and transfers the data of the separated intermediate image portion 25 into the page buffer "B" area 12.

The electronic filing apparatus determines erased portions in the intermediate image portion 25, some of the erased portions being bounded by the partition line LA and the partition reference line L2 and the others being bounded by the partition line LB and the partition reference line L3. The data of these erased portions will be eliminated from the data of the separated intermediate image portion 25.

Figure 17:
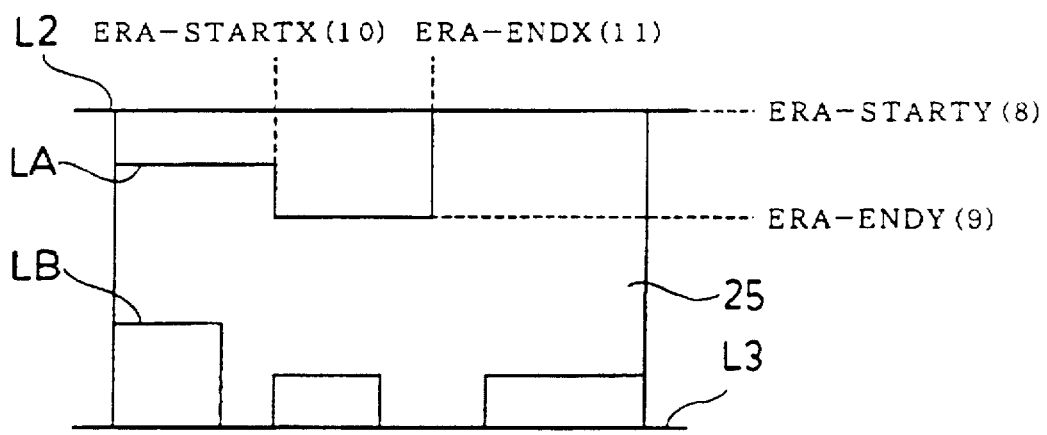

As shown in FIG. 17, a y coordinate ERA-STARTX (8) of a start point (the upper left corner) of a first one of the erased portions is set in the value of the minimum y coordinate of the partition reference line L2. A y coordinate ERA-ENDY (9) of an end point (the lower right corner) of this erased portion is set in the value of the maximum y coordinate of the splitting positions of the partition line LA. An x coordinate ERA-STARTX (10) of the start point of the erased portion is set in accordance with the splitting positions of the partition line LA. An x coordinate ERA-ENDX (11) of the end point of the erased portion is set in accordance with the splitting positions of the partition line LA.

Figure 18:
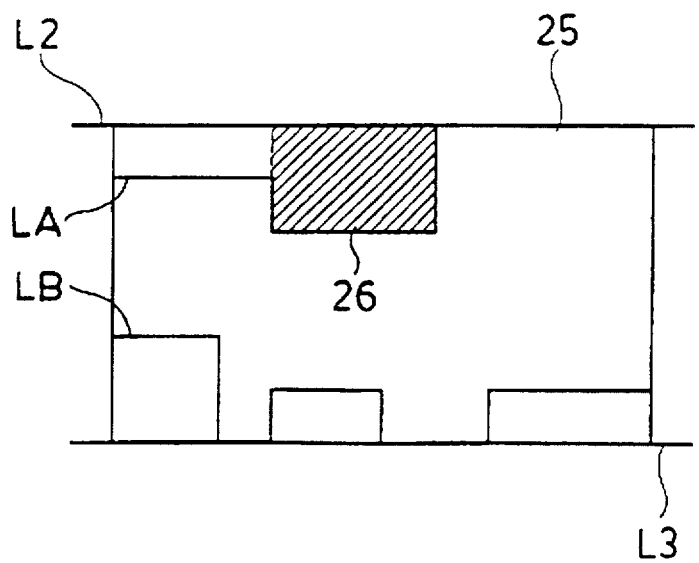

As shown in FIG. 18, the x and y coordinates of the start and end points of the erased portion 26 are thus determined, and the electronic filing apparatus eliminates the data of the erased portion 26 (the shaded area) from the data of the intermediate image portion 25.

Figure 19:
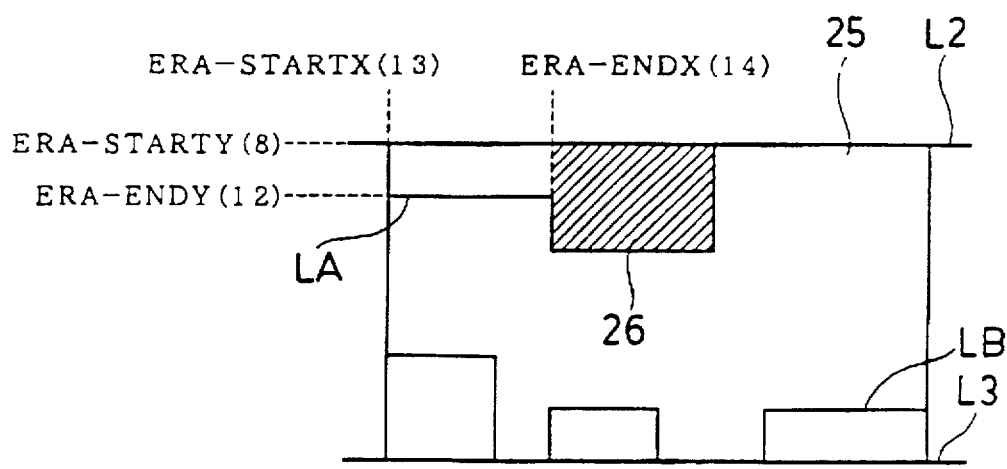

Further, as shown in FIG. 19, a y coordinate ERA-STARTY (8) of a start point (the upper left corner) of a second one of the erased portions is set in the value of the minimum y coordinate of the partition reference line L2. A y coordinate ERA-ENDY (12) of an end point (the lower right corner) of this erased portion is set in the value of the second greatest y coordinate of the splitting positions of the partition line LA. An x coordinate ERA-STARTX (13) of the start point of the erased portion is set in accordance with the splitting positions of the partition line LA. An x coordinate ERA-ENDX (14) of the end point of the erased portion is set in accordance with the splitting positions of the partition line LA.

Figure 20:
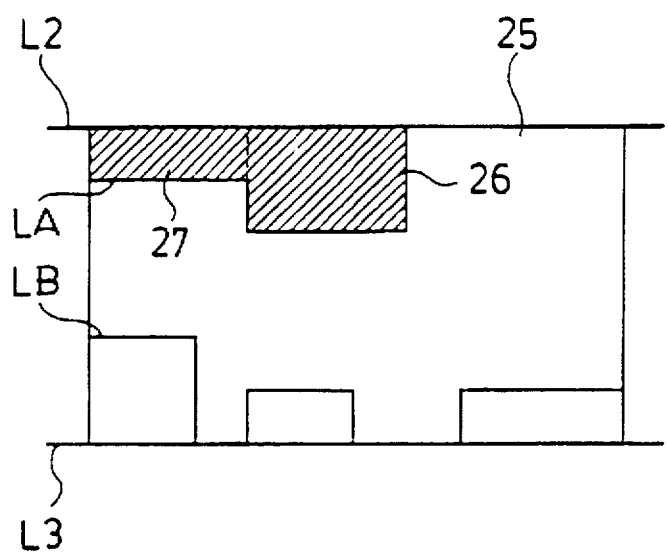

As shown in FIG. 20, the x and y coordinates of the start and end points of the erased portion 27 are thus determined, and the electronic filing apparatus eliminates the data of the erased portion 27 (the shaded area) from the data of the intermediate image portion 25.

Alternatively, it is possible that the electronic filing apparatus determine the coordinates of the erased portions 26 and 27 at the same time, and eliminate the data of the erased portions 26 and 27 from the data of the intermediate image portion 25, at the same time.

Figure 21:
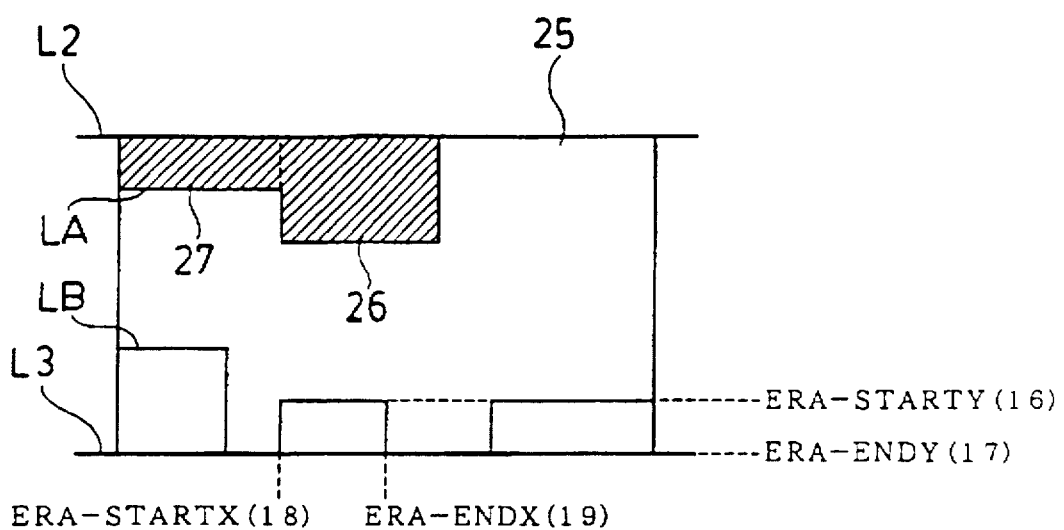

Further, as shown in FIG. 21, a y coordinate ERA-STARTY (16) of a start point of a third erased portion is set in the value of a second greatest y coordinate of the splitting positions of the partition line LB. A y coordinate ERA-ENDY (17) of an end point of the third erased portion is set in the value of the y coordinate of the partition reference line L3. An x coordinate ERA-STARTX (18) of the start point of the third erased portion is set in accordance with the splitting positions of the partition line LB. An x coordinate ERA-ENDX (19) of the end point of the third erased portion is set in accordance with the splitting positions of the partition line LB.

Figure 22:
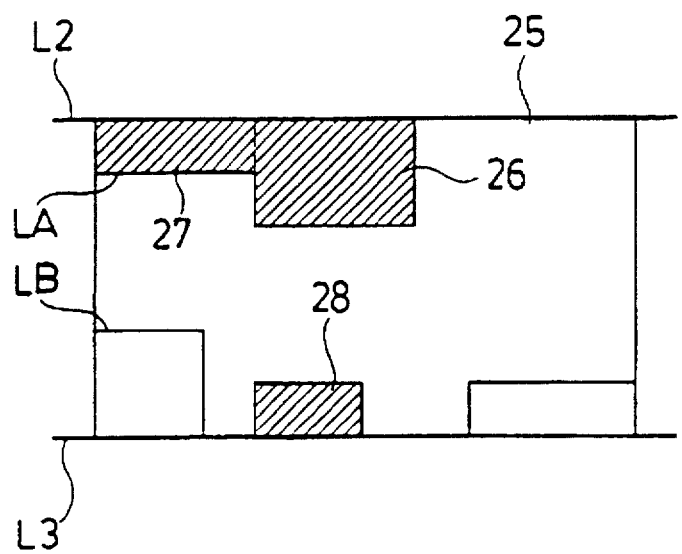

As shown in FIG. 22, the x and y coordinates of the start and end points of the third erased portion 28 are thus determined, and the electronic filing apparatus eliminates the data of the third erased portion 28 (the shaded area) from the data of the intermediate image portion 25.

Figure 23:
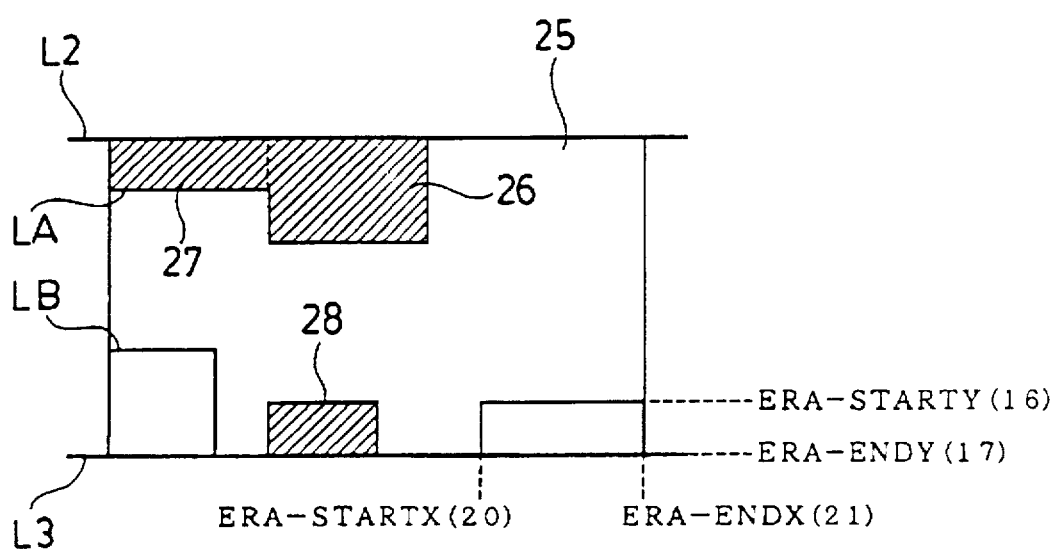

Further, as shown in FIG. 23, a y coordinate ERA-STARTY (16) of a start point of a fourth erased portion is set in the value of the second greatest y coordinate of the splitting positions of the partition line LB. A y coordinate ERA-ENDY (17) of an end point of the fourth erased portion is set in the value of the y coordinate of the partition reference line L3. An x coordinate ERA-STARTX (20) of the start point of the fourth erased portion, and an x coordinate ERA-ENDX (21) of the end point of the fourth erased portion are set in accordance with the splitting positions of the partition line LB.

Figure 24:
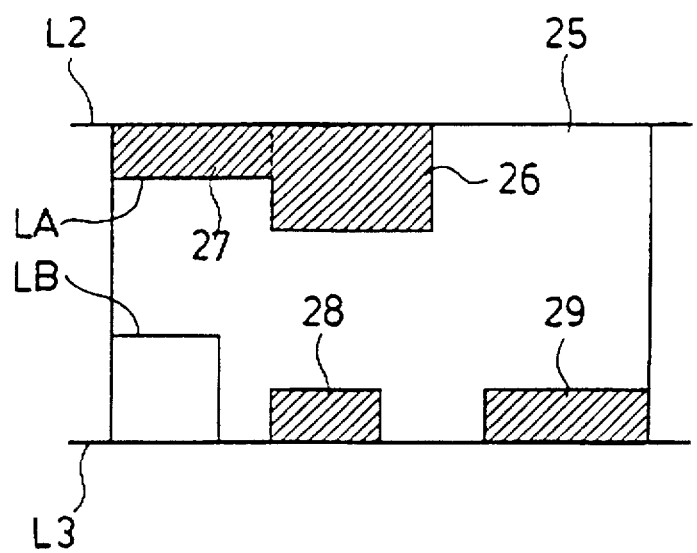

As shown in FIG. 24, the x and y coordinates 29 are thus determined, and the electronic filing apparatus eliminates the data of the fourth erased portion 29 (the shaded area) from the data of the intermediate image portion 25.

Figure 25:
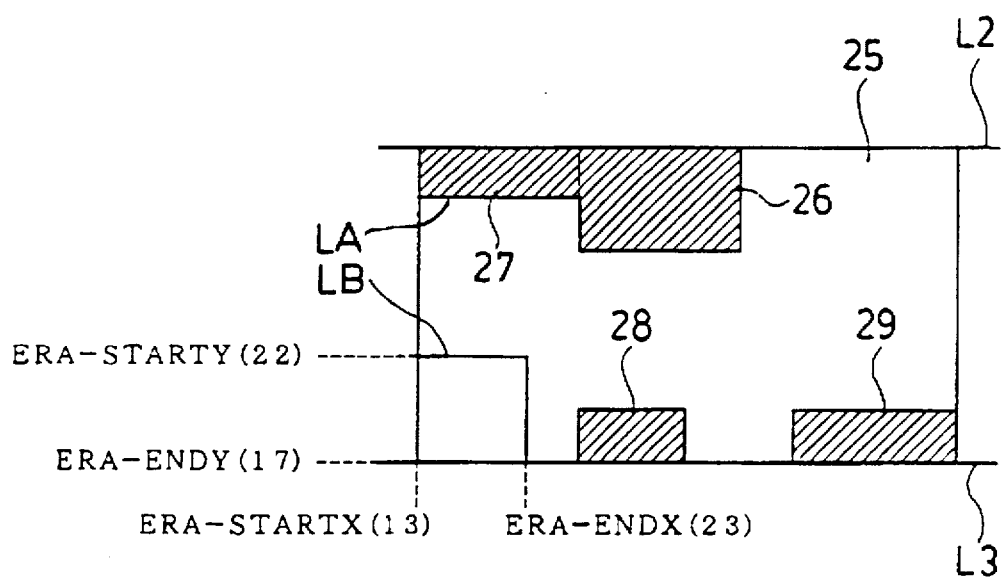

Further, as shown in FIG. 25, a y coordinate ERA-STARTY (22) of a start point of a fifth erased portion is set in the value of the third greatest y coordinate of the splitting positions of the partition line LB. A y coordinate ERA-ENDY (17) of an end point of the fifth erased portion is set in the value of the y coordinate of the partition reference line L3. An x coordinate ERA-STARTX (13) of the start point of the fifth erased portion, and an x coordinate ERA-ENDX (23) of the end point of the fifth erased portion are set in accordance with the splitting positions of the partition line LB.

Figure 26:
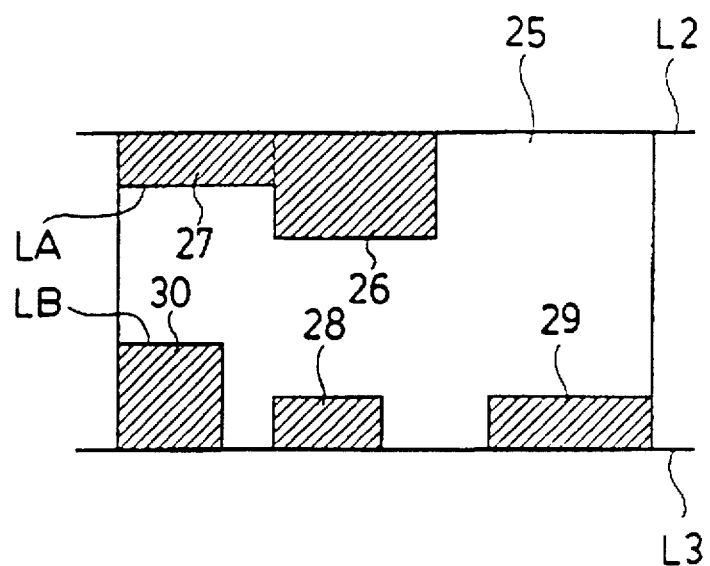

As shown in FIG. 26, the x and y coordinates of the start and end points of the fifth erased portion 30 are thus determined, and the electronic filing apparatus eliminates the data of the fifth erased portion 30 (the shaded area) from the data of the intermediate image portion 25.

Figure 27:
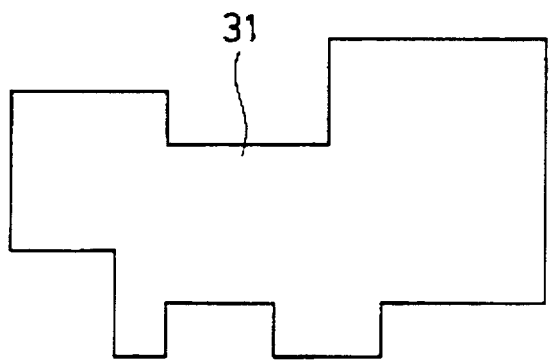
Figure 28:
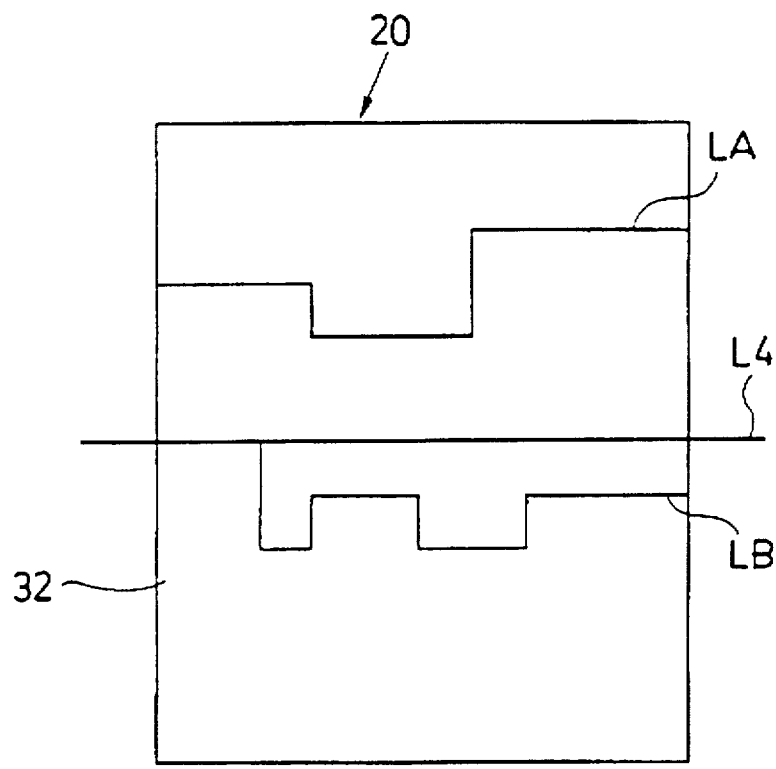
Figure 29:
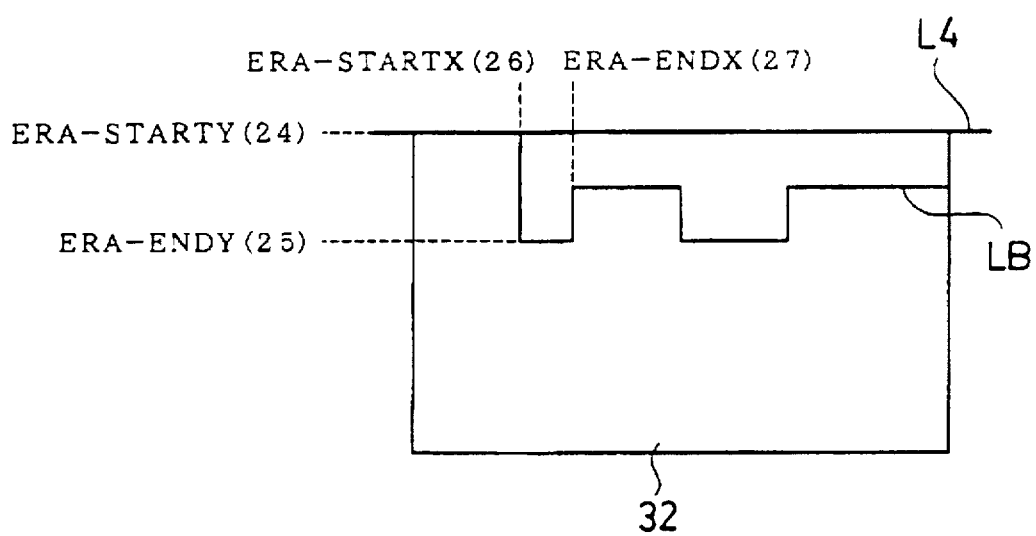
Figure 30:
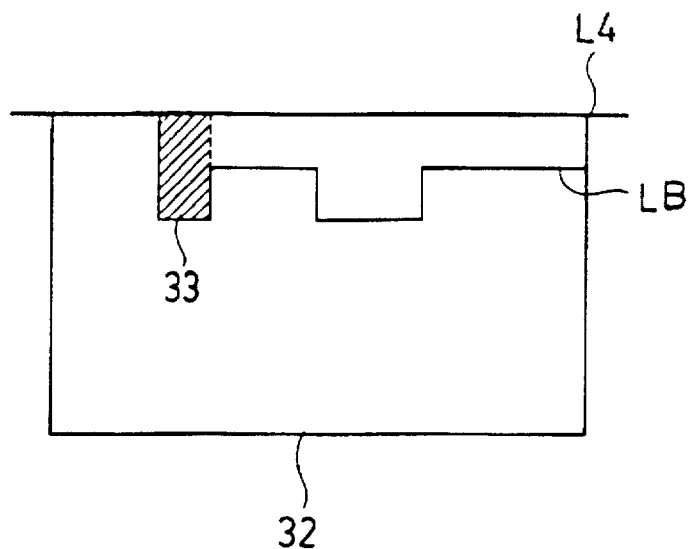
Figure 31:
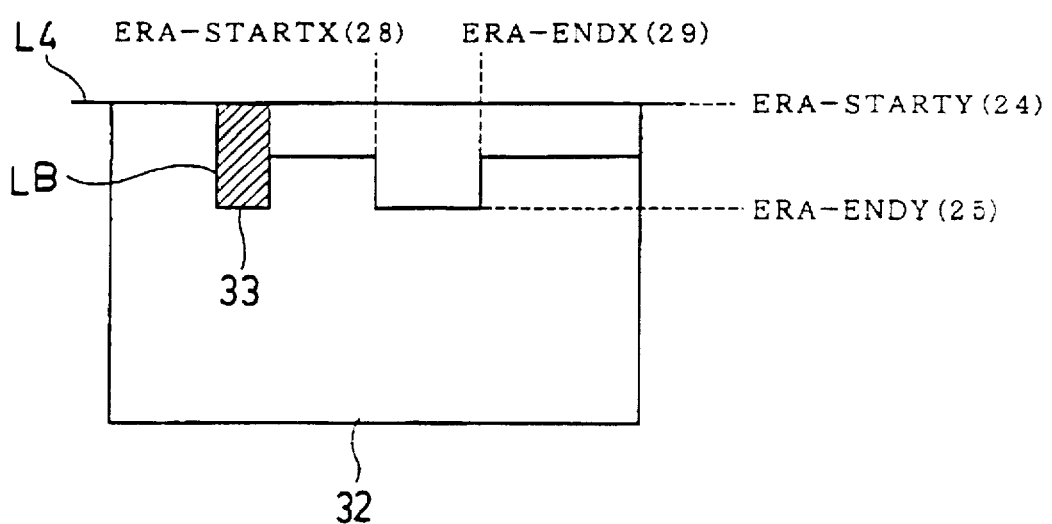
Figure 32:
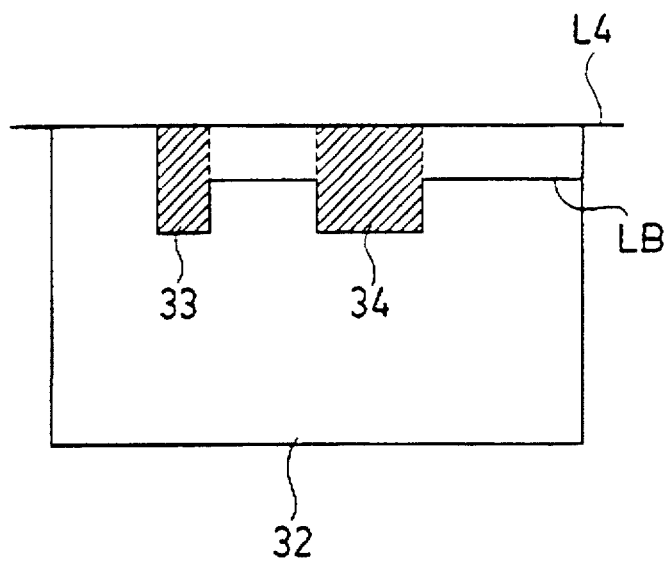
Figure 33:
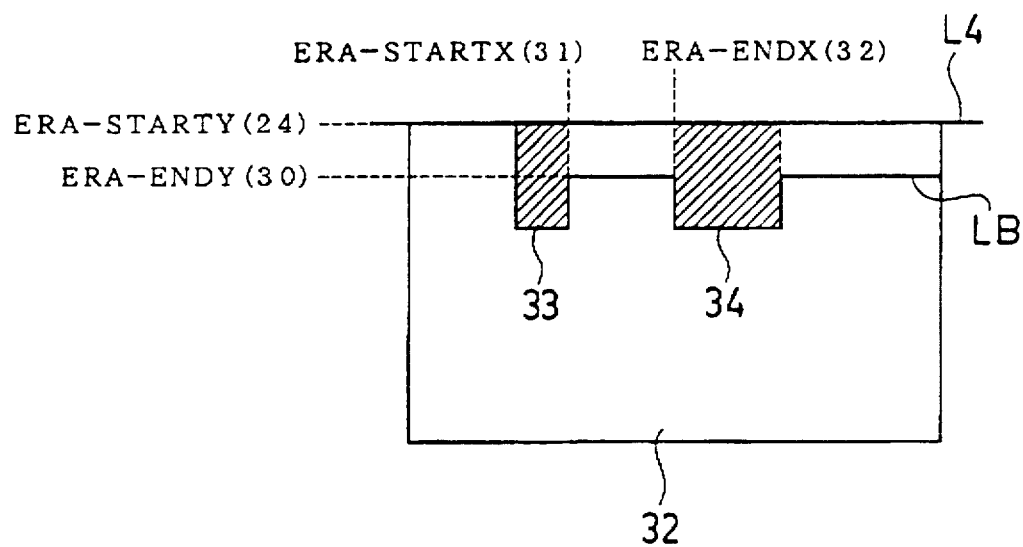
Figure 34:
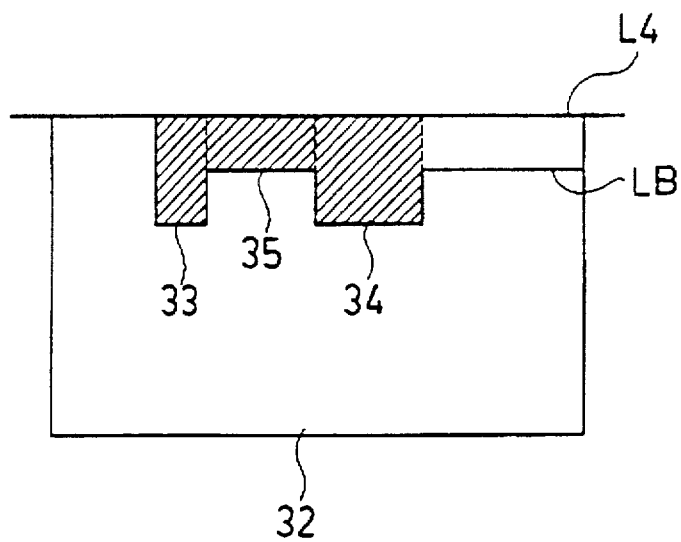
Figure 35:
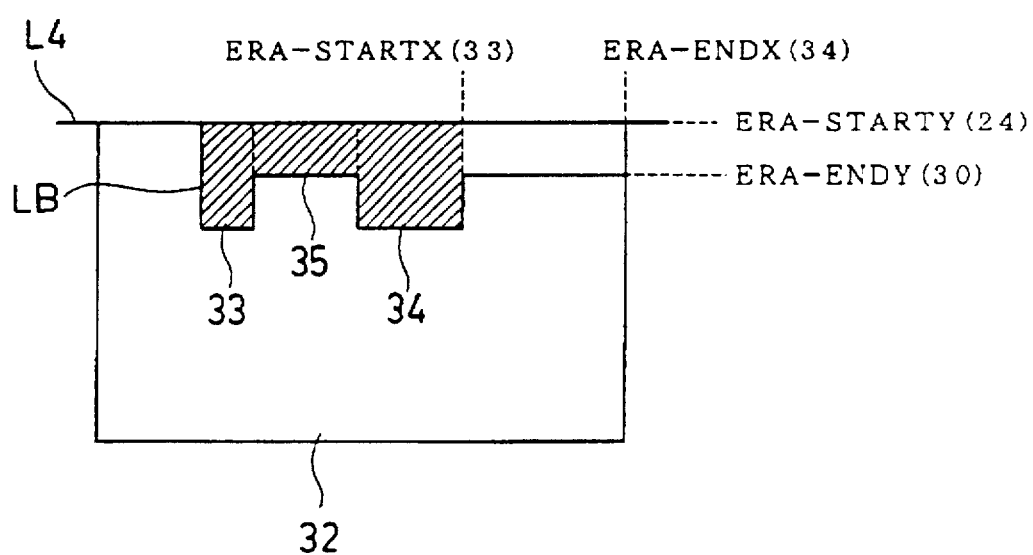
Figure 36:
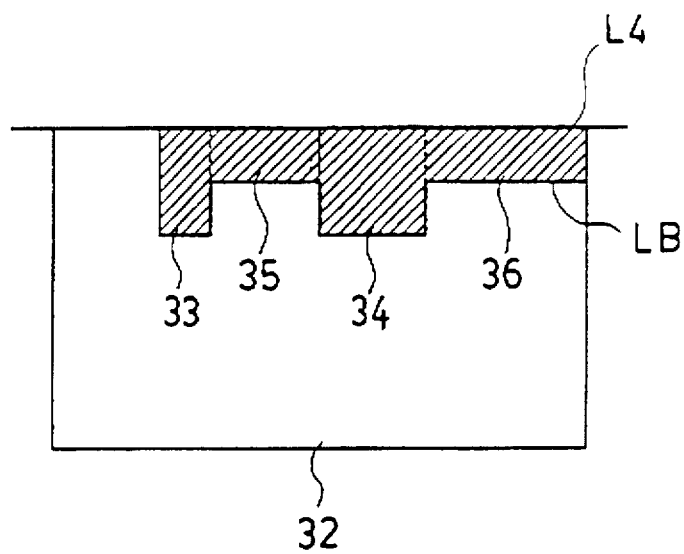
Figure 37:
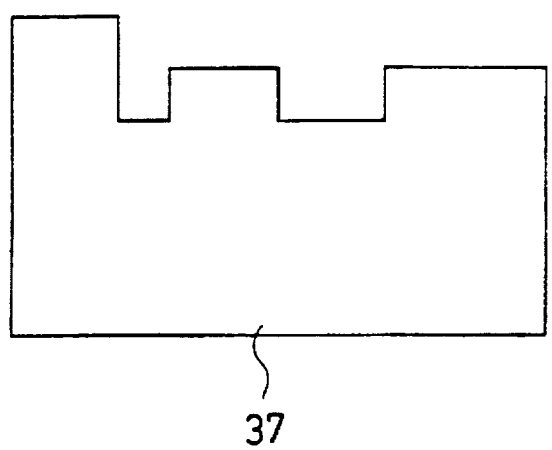

Accordingly, as shown in FIG. 27, the subsequent split-image 31 in which the data of the erased portions 26 through 30, each of which is bounded by the partition line and the partition reference line, are eliminated from the intermediate image portion 35 is generated. This subsequent split-image 31 is printed on the recording sheet having the A4 size by the electronic filing apparatus.

Finally, the final split-image will be generated from the original image 20. The operations of the electronic filing apparatus to generate the final split-image 37 from the original image 20 are illustrated in FIGS. 28 through 37. These operations are substantially the same as the above-described operations of the electronic filing apparatus to generate the first split-image or the subsequent split-image from the original image 20. Therefore, a description thereof will be omitted.

Next, a description will be given of a split image generating process which is performed by the electronic filing apparatus in one embodiment of the present invention.

Figure 38:
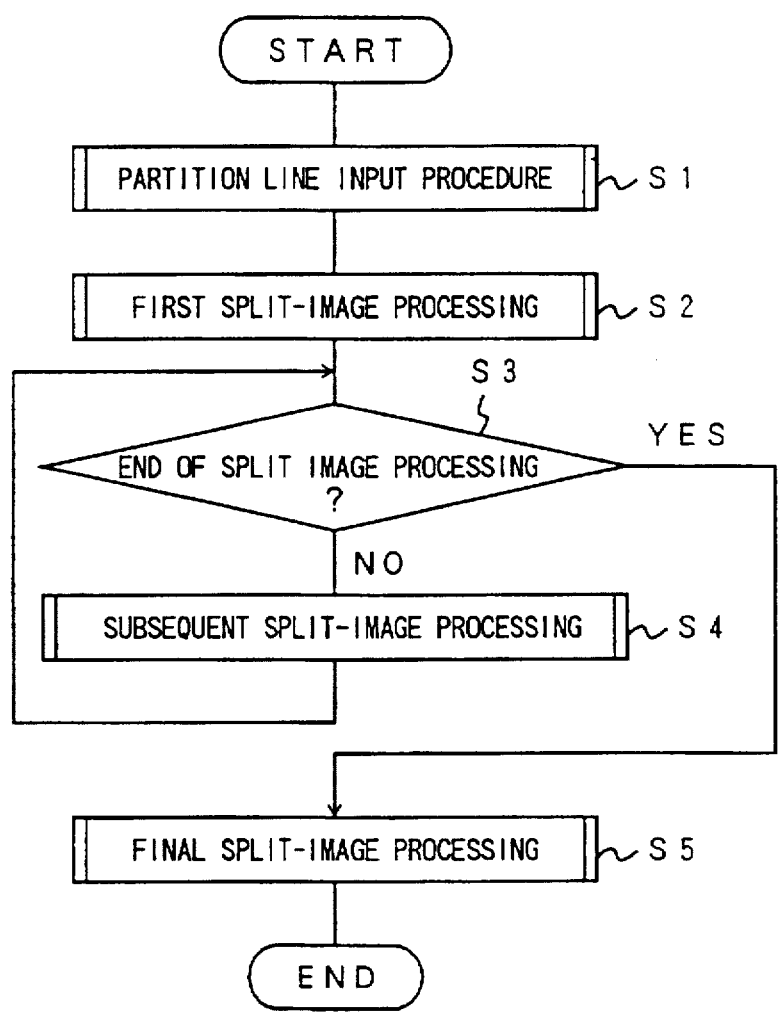
FIG. 38 is a flow chart for explaining a split image generating process which is performed by the electronic filing apparatus.

FIG. 38 shows a split image generating process which is performed by the electronic filing apparatus. In FIG. 38, step S1 performs a partition line input procedure (see FIG. 39). Step S2 performs a first split-image processing procedure (see FIG. 42). Step S3 detects whether an end of the split image processing has been found after a preceding split-image processing procedure is performed.

When the result at step S3 is affirmative, it is determined that the final split-image processing procedure follows the preceding split-image processing procedure.

When the result at step S3 is negative, it is determined that the subsequent split-image processing procedure is still in process. Step S4 performs a subsequent split-image processing procedure (see FIG. 45).

Step S5 performs a final split-image processing procedure. After the above step S5 is performed, the split image generating process ends. By this split image generating process, the split images are generated from the original image by the electronic filing apparatus of the present invention in accordance with the partition lines set with respect to the original image.

Figure 39:
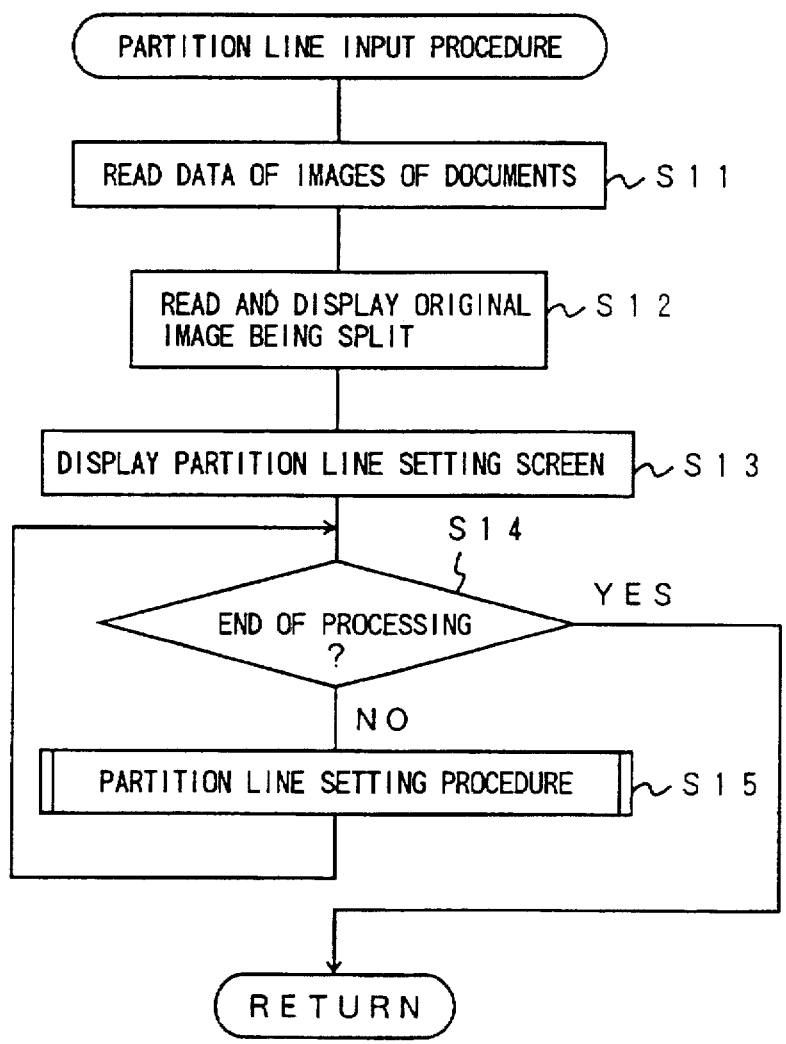
FIG. 39 is a flow chart for explaining a partition line input procedure.

FIG. 39 shows a partition line input procedure which corresponds to the step S1 in the split image generating process in FIG. 38.

In the partition line input procedure in FIG. 39, step S11 reads data of images of documents from the storage unit. Step S12 reads an original image which must be split into parts for printing, and displays the original image.

After the above step S12 is performed, step S13 displays a partition line setting screen. Step S14 detects whether an end of the partition line input processing has been found.

Figure 40:
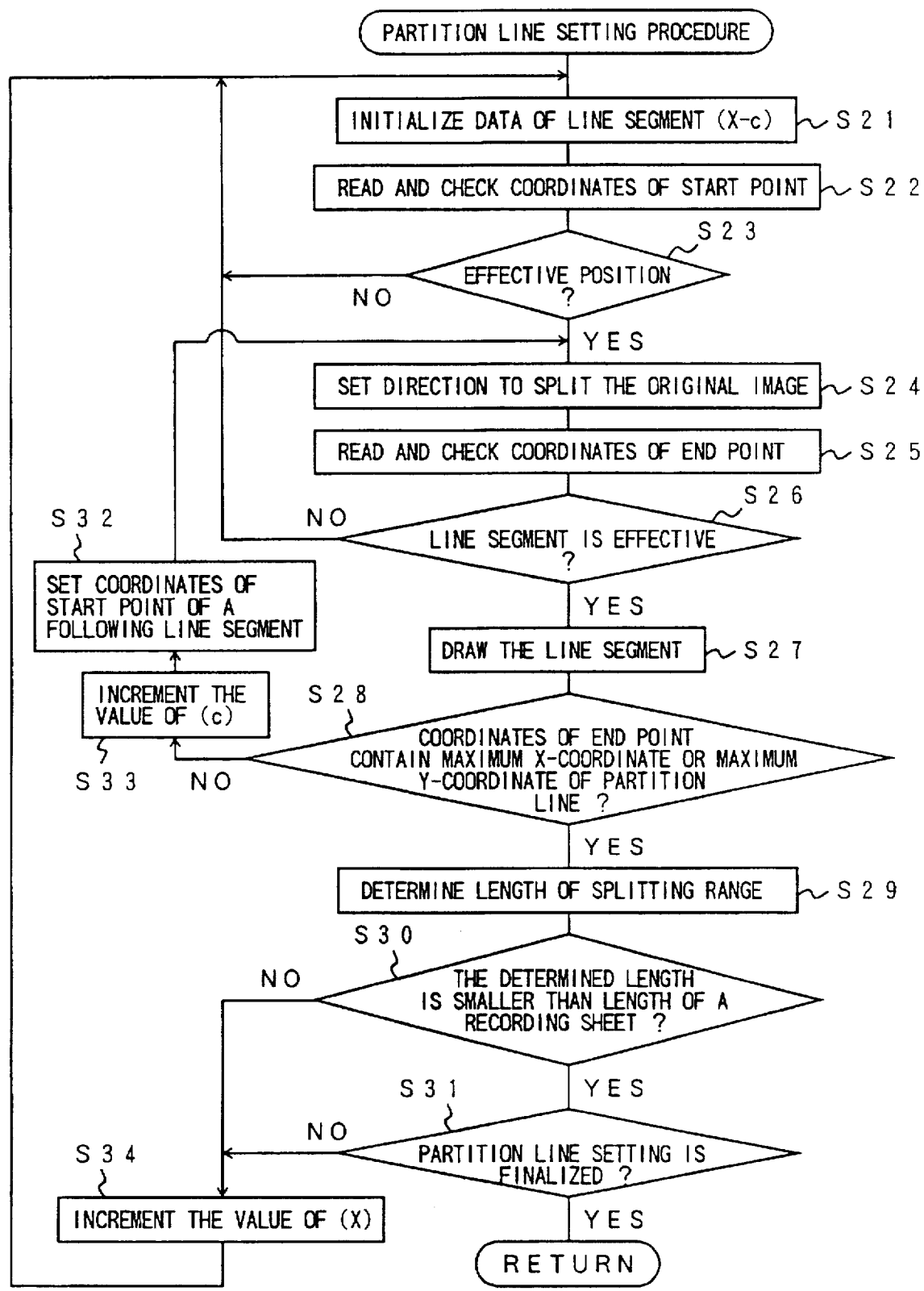
FIG. 40 is a flow chart for explaining a partition line setting procedure.

When the result at step S14 is negative, step S15 performs a partition line setting procedure (see FIG. 40). After the step S15 is performed, the step S14 is performed again.

When the result at step S14 is affirmative, the partition line input procedure ends. Then, control is transferred to a following step in the split image generating process in FIG. 38.

FIG. 40 shows a partition line setting step which corresponds to the step S15 of the partition line input procedure in FIG. 39. During the time the partition line setting screen is displayed, data of line segments (each of which is identified by a line segment number) of a partition line is input by the operator on the display unit 5 of the electronic filing apparatus.

Figure 41:
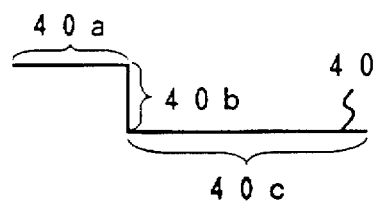
FIG. 41 is a diagram showing line segments of a partition line.

FIG. 41 shows an example of the partition line. In FIG. 41, a partition line 40 consists of line segments 40a, 40b, and 40c. In the electronic filing apparatus in one embodiment of the present invention, one of the line segments 40a, 40b, and 40c is identified by a line segment number (X-c).

In FIG. 40, step S21 initializes data of a line segment identified by the line segment No.(X-c). Step S22 reads and checks coordinates of a start point of the line segment No.(X-c). Step S23 detects whether a position indicated by the coordinates of the start point is an effective position at which the original image is split (i.e., according to the size of the recording sheets on which the split image is to be printed).

When the result at step S23 is negative, it is determined that the position indicated by the coordinates of the start point is not effective. The above step S21 is performed again.

When the result at step S23 is affirmative, step S24 sets a direction of the splitting of the original image in a vertical direction or a horizontal direction.

After the above step S24 is performed, step S25 reads and checks coordinates of an end point of the line segment No.(X-c).

Step S26 detects whether the line segment indicated by the coordinates of the start and end points is an effective one among the line segments of the partition line along which the original image is split.

When the result at step S26 is negative, it is determined that the line segment indicated by the coordinates is not effective. The above step S21 is performed again.

When the result at step S26 is affirmative, step S27 draws the line segment indicated by the coordinates on the display unit.

After the above step S27 is performed, step S28 detects whether the coordinates of the end point of the line segment contain the maximum x coordinate or the maximum y coordinate of the partition line.

When the result at step S28 is negative, it is determined that the coordinates of the end point of the line segment do not contain the maximum x coordinate and the maximum y coordinate. Step S33 increments the value of c (c=c+1). After the above step S33 is performed, step S32 sets the coordinates of a start point of a following line segment by copying the coordinates of the end point of the present line segment to those of the following line segment. After the above step S32 is performed, the above steps S24 through S28 are performed again.

When the result at step S28 is affirmative, step S29 determines a length of the line segment which is the splitting range. Step S30 detects whether the determined length is smaller than a length of the recording sheet.

When the result at step S30 is negative, it is determined that the determined length is not smaller than the length of the recording sheet. Step S34 increments the value of X (X=X+1). After the step S34 is performed, the above step S21 is performed again.

When the result at step S30 is affirmative, it is determined that the determined length is smaller than the length of the recording sheet. Step S31 detects whether the partition line setting procedure is finalized.

When the result at step S31 is negative, the above step S34 is performed. After the step S34 is performed, the above step S21 is performed again.

When the result at step S31 is affirmative, the partition line setting procedure ends, and control is transferred to a following step in the split image generating process in FIG. 38.

Figure 42:
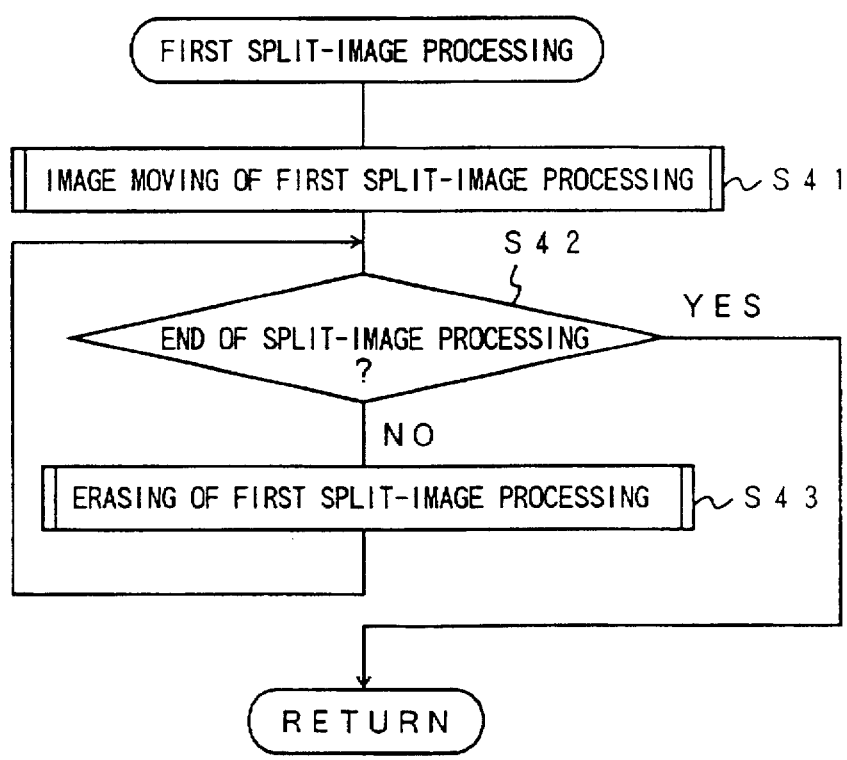
FIG. 42 is a flow chart for explaining a first split-image processing procedure.

FIG. 42 shows a first split-image processing procedure which corresponds to the step S2 in the split image generating process in FIG. 38.

Figure 43:
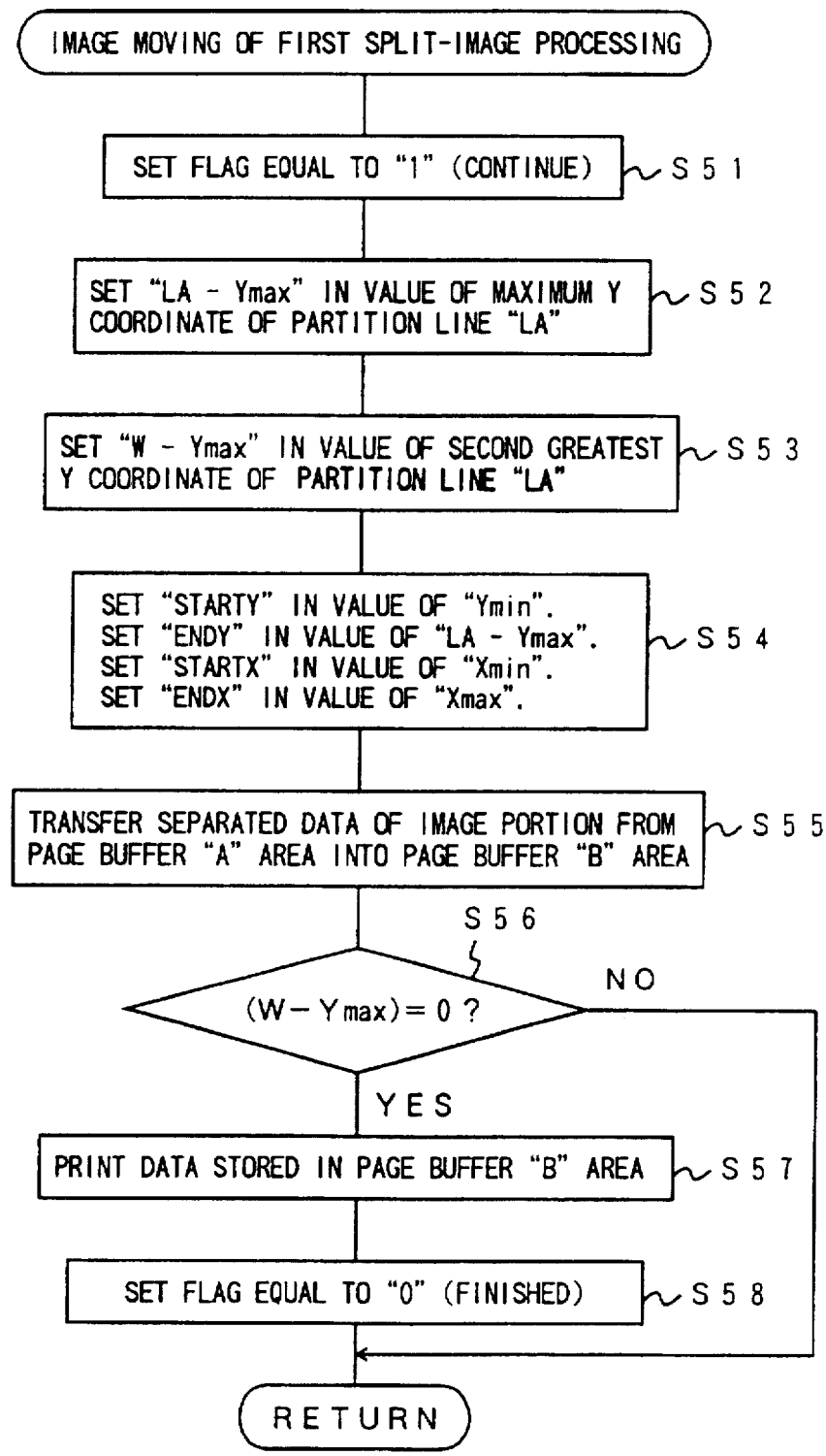
FIG. 43 is a flow chart for explaining an image moving step of the first split-image processing procedure.

In FIG. 42, step S41 performs an image moving of the first split-image processing procedure (see FIG. 43). Step S42 detects whether an end of the first split-image processing has been found.

When the result at step S42 is affirmative, the first split-image processing procedure ends, and control is transferred to a following step in the split image generating process in FIG. 38.

Figure 44:
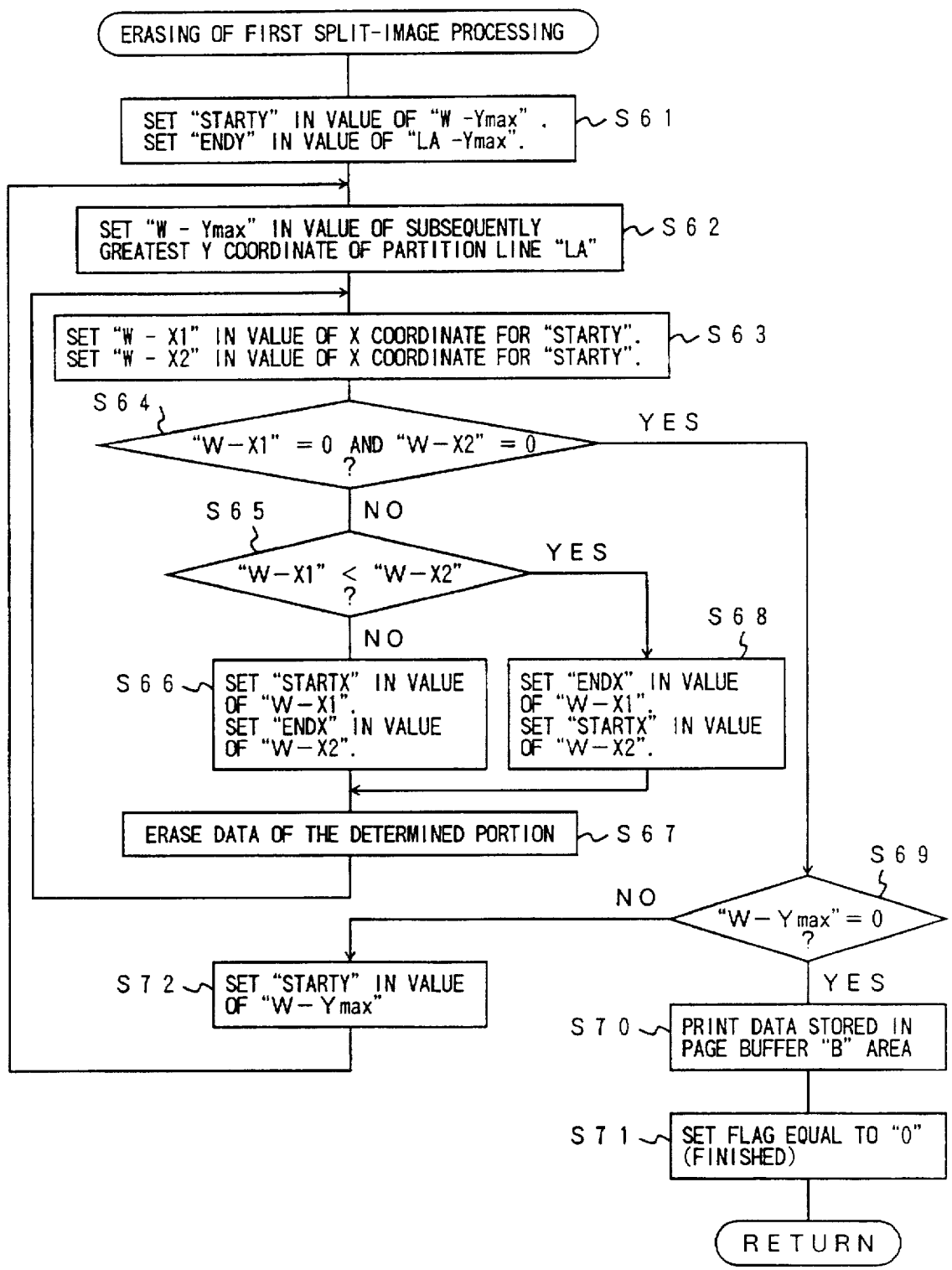
FIG. 44 is a flow chart for explaining an erasing step of the first split-image processing procedure.

When the result at step S42 is negative, step S43 performs an erasing of the first split-image processing procedure (see FIG. 44). After the step S43 is performed, the above step S42 is performed again.

FIG. 43 shows an image moving procedure which corresponds to the step S41 in the first split-image processing procedure in FIG. 42. By this image moving procedure, the original image from the page buffer "A" area 11 is divided into image portions by a reference partition line, and separated data of a first image portion is transferred into the page buffer "B" area 12.

In FIG. 43, step S51 sets a flag equal to "1". The value "1" of this flag indicates that this image moving procedure continues to run.

Step S52 finds a maximum y coordinate of the splitting positions of the partition line LA, and sets "LA-Ymax" in the value of the maximum y coordinate. Step S53 finds a second greatest y coordinate of the splitting positions of the partition line LA, and sets "W-Ymax" in the value of the second greatest y coordinate. When no second greatest y coordinate is found, "W-Ymax" is set in the value zero.

At step S54, the parameters of a rectangular image portion in which the first split-image is included are set. "STARTY" is set in the value of "Ymin", "ENDY" is set in the value of "LA–Ymax", "STARTX" is set in the value of "Xmin", and "ENDX" is set in the value of "Xmax".

Step S55 separates the data of the image portion whose parameters are set at step S54, from the data of the original image read from the page buffer "A" area 11, and transfers the separated data into the page buffer "B" area 12.

After the step S55 is performed, step S56 detects whether the value of "W–Ymax" is equal to "0".

When the result at step S56 is negative, the image moving procedure ends. Control is transferred to a following step in the first split-image processing procedure in FIG. 42.

When the result at step S56 is affirmative, step S57 prints the data (the first split image) stored in the page buffer "B" area 12. Step S58 sets the flag equal to "0". The value "0" of the flag indicates that the image moving procedure is finished. Control is transferred to the following step in the first split-image processing procedure in FIG. 42.

FIG. 44 shows an erasing procedure which corresponds to the step S43 in the first split-image processing procedure in FIG. 42. By this erasing procedure, data of the erased portions, bounded by the partition line and the reference partition line, is erased from the data of the first image portion stored in the page buffer "B" area, and the resulting data is printed on the recording sheet.

In FIG. 44, step S61 sets "STARTY" in the value of "W–Ymax", and sets "ENDY" in the value of "LA–Ymax". Step S62 finds a subsequently greatest y coordinate of the splitting positions of the partition line "LA", and sets "W–Ymax" in the value of the subsequently greatest y coordinate. When no subsequently greatest y coordinate is found, "W–Ymax" is set equal to the value "0".

After the step S62 is performed, step S63 finds an x coordinate of the start point for "STARTY", and sets "W–X1" in the value of the x coordinate. Also, step S63 sets "W–X2" in the value of the x coordinate of the start point for "STARTY". When no x coordinate of the start point is found, "W–X1" and "W–X2" are set equal to the value "0".

After the step S63 is performed, step S64 detects whether both "W–X1" and "W–X2" are equal to the value "0".

When the result at step S63 is negative, step S65 detects whether the value of "W–X1" is smaller than the value "W–X2". When the result at step S65 is negative, step S66 sets "STARTX" in the value of "W–X1" and sets "ENDX" in the value of "W–X2". On the other hand, when the result at step S65 is affirmative, step S68 sets "ENDX" in the value of "W–X1" and sets "STARTX" in the value of "W–X2".

After either the step S66 or the step S68 is performed, step S67 erases the data of the rectangular portion whose parameters are thus determined, from the data of the original image. After the step S67 is performed, the above step S63 is performed again.

When the result at step S64 is affirmative, step S69 detects whether the value of "W–Ymax" is equal to "0".

When the result at step S69 is negative, step S72 sets "STARTY" in the value of "W–Ymax". After the step S72 is performed, the above step S63 is performed again.

When the result at step S69 is affirmative, step S70 prints data stored in the page buffer "B" area 12 on the recording sheet. After the step S70 is performed, step S71 sets the flag equal to "0". The value "0" of this flag indicates that the erasing procedure is finished. Control is transferred to a following step in the first split-image processing procedure in FIG. 42.

Figure 45:
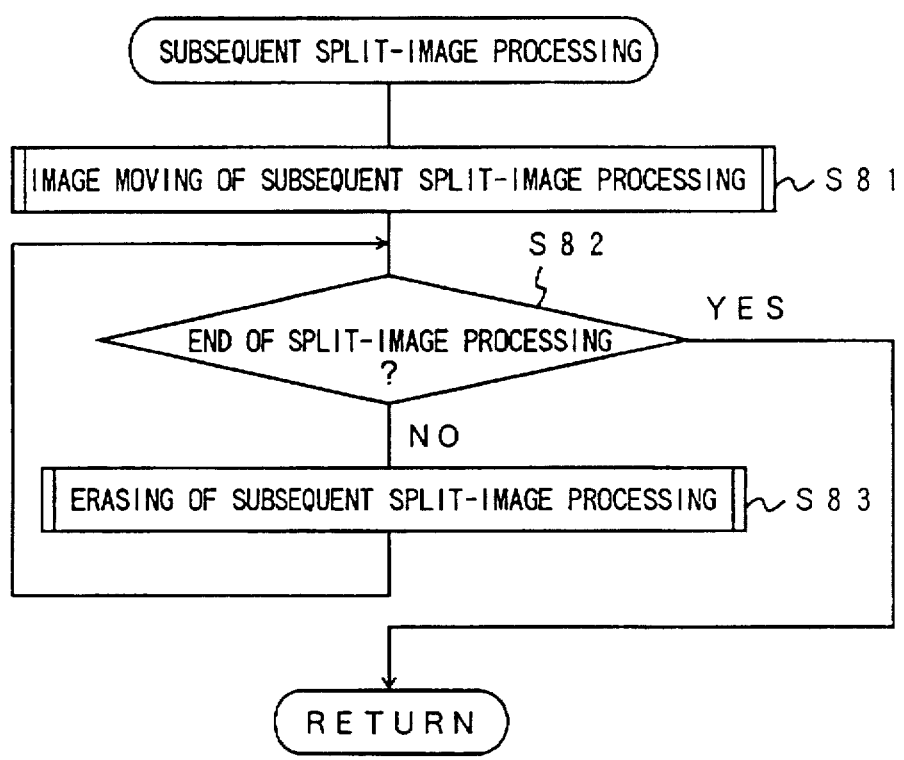
FIG. 45 is a flow chart for explaining a subsequent split-image processing procedure.

FIG. 45 shows a subsequent split-image processing procedure which corresponds to the step S4 in the split image generating process in FIG. 38.

Figure 46:
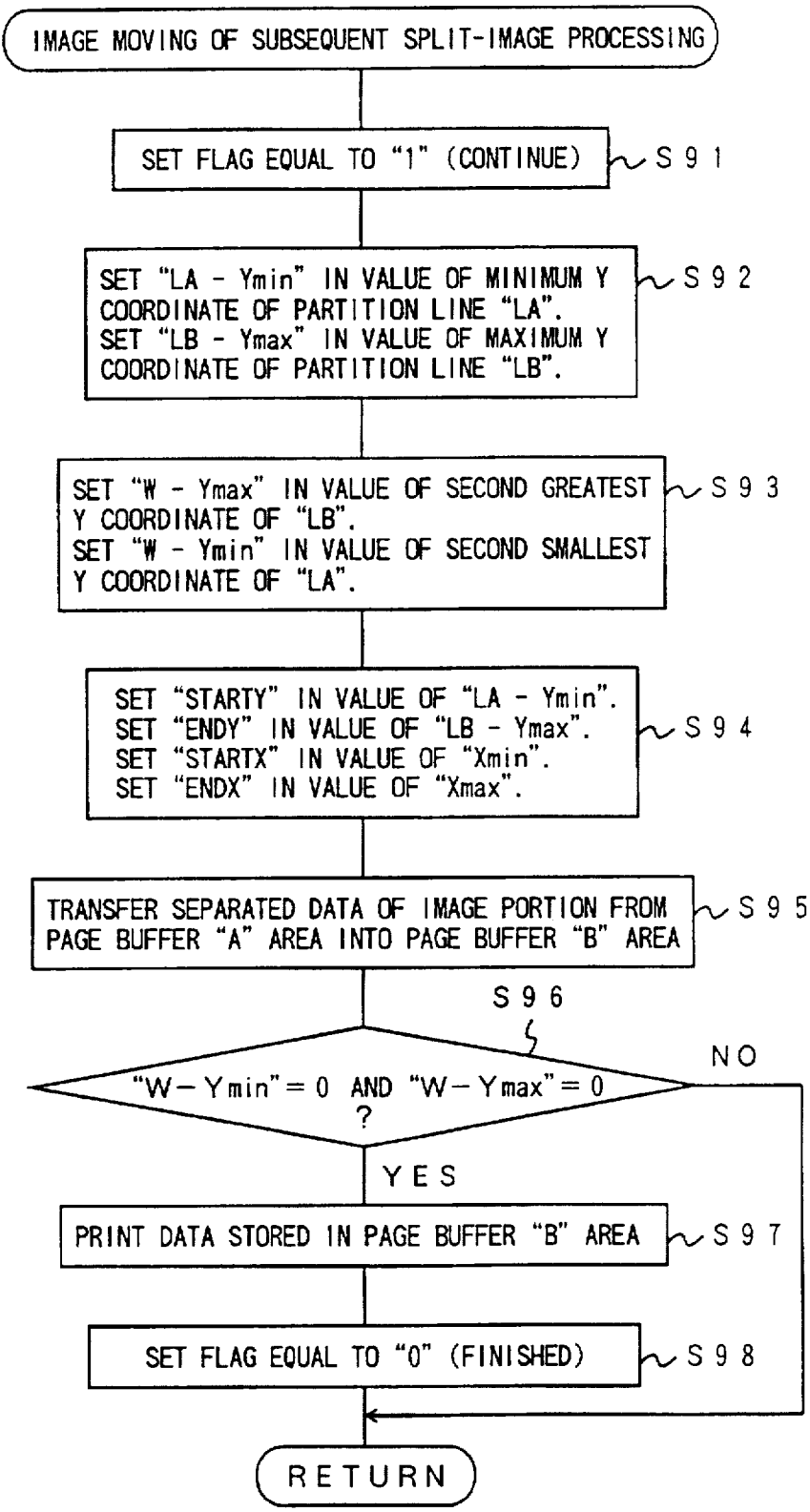
FIG. 46 is a flow chart for explaining an image moving step of the subsequent split-image processing procedure.

In FIG. 45, step S81 performs an image moving of the subsequent split-image processing procedure (see FIG. 46). After the step S81 is performed, step S82 detects whether an end of the subsequent split-image processing has been found.

When the result at step S82 is affirmative, the subsequent split-image processing procedure ends. Control is transferred to a following step in the split image generating process in FIG. 38.

Figure 47A:
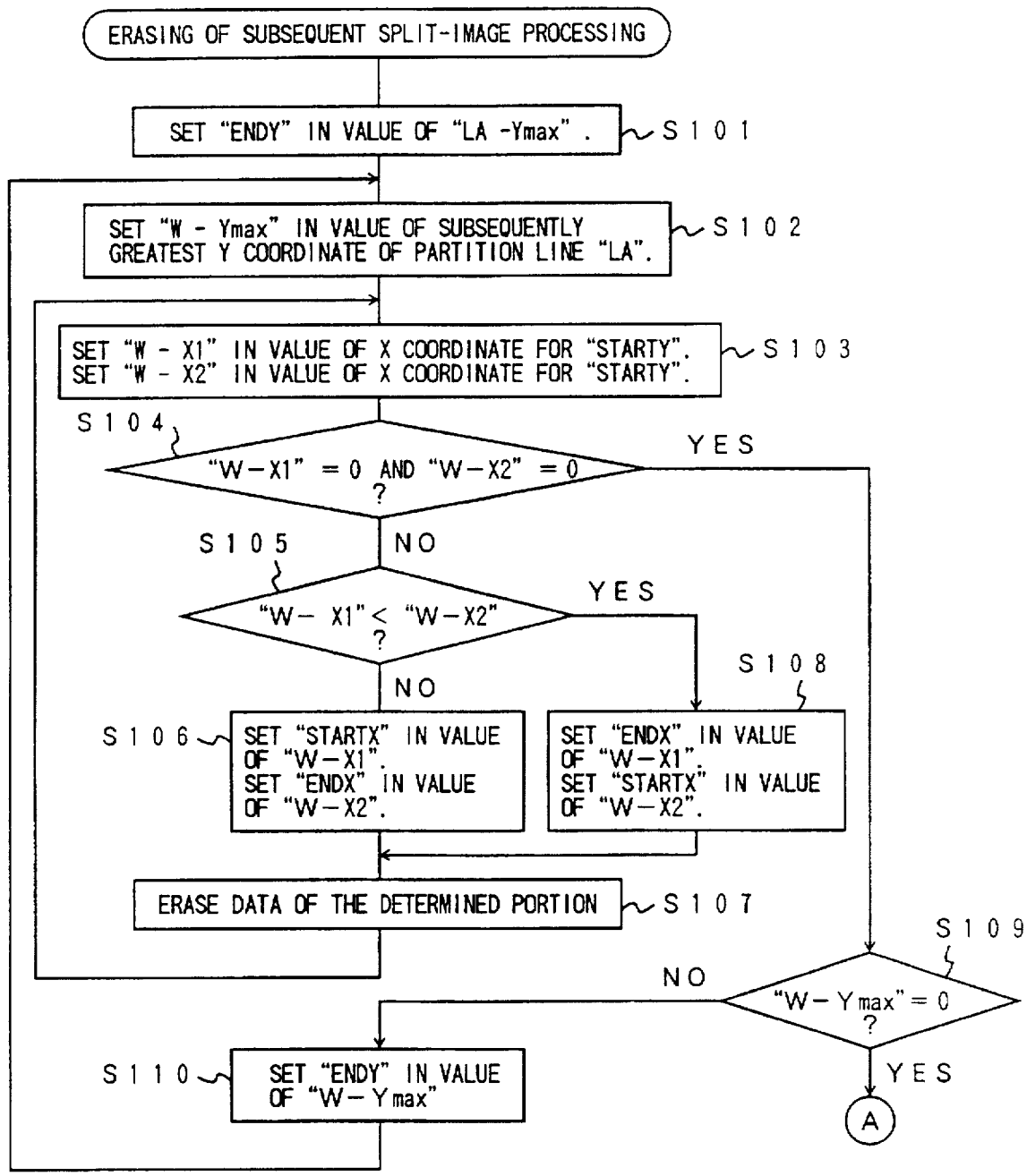
FIGS. 47A, 47B, and 47C are a flow chart for explaining an erasing step of the subsequent split-image processing procedure.
Figure 47B:
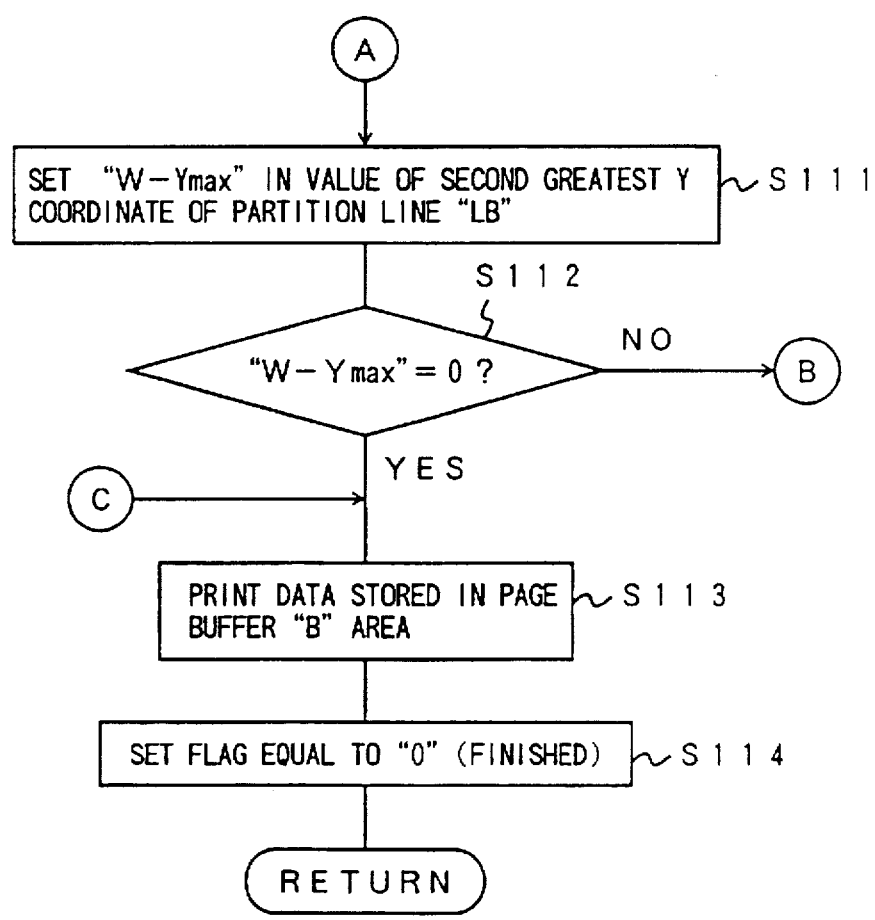
Figure 47C:
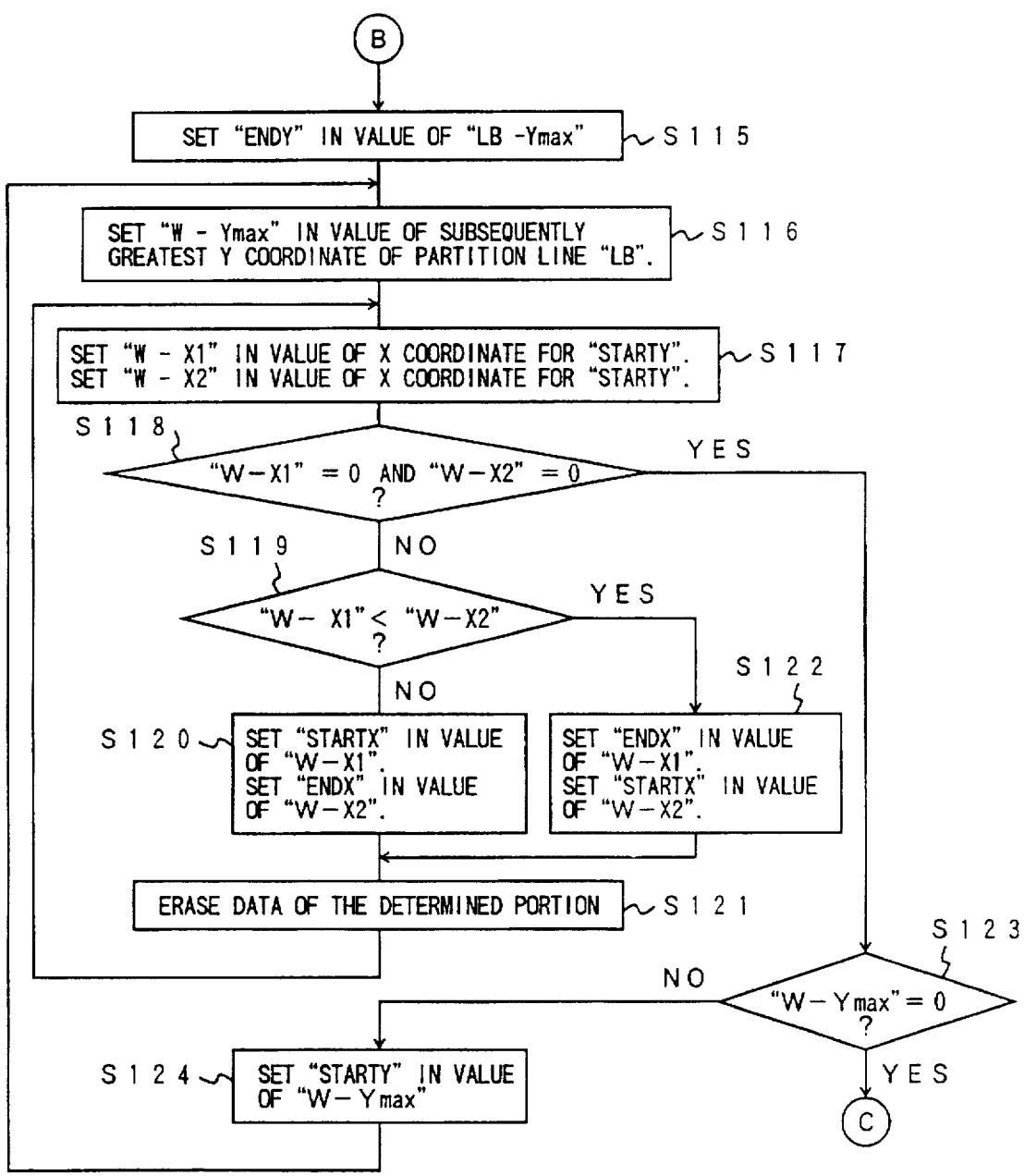

When the result at step S82 is negative, step S83 performs an erasing of the subsequent split-image processing procedure (see FIGS. 47A through 47C). After the step S83 is performed, the above step S82 is performed again.

FIG. 46 shows an image moving procedure which corresponds to the step S81 in the subsequent split-image processing procedure in FIG. 45. By this image moving procedure, the original image from the page buffer "A" area 11 is divided into image portions by the reference partition line, and separated data of a subsequent image portion is transferred into the page buffer "B" area 12.

In FIG. 46, step S91 sets a flag equal to "1". The value "1" of this flag indicates that this image moving procedure continues to run.

Step S92 finds a minimum y coordinate of the splitting positions of the partition line LA and sets "LA–Ymin" in the value of the minimum y coordinate. Step S92 finds a maximum y coordinate of the splitting positions of the partition line LB and sets "LB–Ymax" in the value of the maximum y coordinate.

Step S93 finds a second greatest y coordinate of the splitting positions of the partition line LB and sets "W–Ymax" in the value of the second greatest y coordinate. When no second greatest y coordinate is found, "W–Ymax" is set in the value "0". Step S93 finds a second smallest y coordinate of the splitting positions of the partition line LA and sets "W–Ymin" in the value of the second smallest y coordinate. When no second smallest y coordinate is found, "W–Ymin" is set in the value "0".

At step S94, the parameters of a rectangular image portion in which the subsequent split-image is included are set. "STARTY" is set in the value of "LA–Ymin", "ENDY" is set in the value of "LB–Ymax", "STARTX" is set in the value of "Xmin", and "ENDX" is set in the value of "Xmax".

Step S95 separates the data of the image portion whose parameters are set at step S94, from the data of the original image, and transfers the separated data into the page buffer "B" area 12.

After the step S95 is performed, step S96 detects whether both "W–Ymax" and "W–Ymax" are equal to "0".

When the result at step S96 is negative, the image moving procedure ends. Control is transferred to a following step in the subsequent split-image processing procedure in FIG. 45.

When the result at step S96 is affirmative, step S97 prints the data (the subsequent split image) stored in the page buffer "B" area 12. Step S98 sets the flag equal to "0". The value "0" of the flag indicates that the image moving procedure is finished. Control is transferred to the following step in the subsequent split-image processing procedure in FIG. 45.

FIGS. 47A, 47B, and 47C show an erasing procedure which corresponds to the step S83 in the subsequent split-image processing procedure in FIG. 45. By this erasing procedure, data of the erased portions, bounded by the partition line and the reference partition line, is erased from the data of the subsequent image portion stored in the page buffer "B" area, and the resulting data is printed on the recording sheet.

In FIG. 47A, step S101 sets "ENDY" in the value of "LA-Ymax". Step S102 finds a subsequently greatest y coordinate of the splitting positions of the partition line "LA", and sets "W-Ymax" in the value of the subsequently greatest y coordinate. When no subsequently greatest y coordinate is found. "W-Ymax" is set equal to the value "0".

After the step S102 is performed, step S103 finds an x coordinate of the start point for "STARTY" and sets "W-X1" in the value of the x coordinate. Also, step S103 sets "W-X2" in the value of the x coordinate of the start point for "STARTY". When no x coordinate of the start point is found. "W-X1" and "W-X2" are set equal to the value "0".

After the step S103 is performed, step S104 detects whether both "W-X1" and "W-X2" are equal to the value "0".

When the result at step S104 is negative, step S105 detects whether the value of "W-X1" is smaller than the value "W-X2". When the result at step S105 is negative, step S106 sets "STARTX" in the value of "W-X1" and sets "ENDX" in the value of "W-X2". On the other hand, when the result at step S105 is affirmative, step S108 sets "ENDX" in the value of "W-X1" and sets "STARTX" in the value of "W-X2".

After either the step S106 or the step S108 is performed, step S107 erases the data of the rectangular portion whose parameters are determined, from the data of the original image. After the step S107 is performed, the above step S103 is performed again.

When the result at step S104 is affirmative, step S109 detects whether the value of "W Ymax" is equal to "0".

When the result at step S109 is negative, step S110 sets "ENDY" in the value of "W-Ymax". After the step S110 is performed, the above step S102 is performed again.

When the result at step S104 is affirmative, step S111 shown in FIG. 47B is performed.

In FIG. 47B, step S111 finds a second greatest y coordinate of the splitting positions of the partition line "LB" and sets "W-Ymax" in the value of the second y coordinate. When no second greatest y coordinate in the partition line "LB" is found, "W-Ymax" is set in the value "0".

After the step S111 is performed, step S112 detects whether the value of "W-Ymax" is equal to "0". When the result at step S112 is affirmative, step S113 prints data stored in the page buffer "B" area 12. Step S114 sets the flag equal to "0". Control is transferred to a following step in the subsequent split-image processing procedure in FIG. 45.

When the result at step S112 is negative, step S115 shown in FIG. 47C is performed.

In FIG. 47C, step S115 sets "ENDY" in the value of "LB-Ymax". Step S116 finds a subsequently greatest y coordinate of the splitting positions of the partition line "LB" and sets "W-Ymax" in the value of the subsequently greatest y coordinate. When no subsequently greatest y coordinate is found, "W-Ymax" is set equal to the value "0".

After the step S116 is performed, step S117 finds an x coordinate of the start point for "STARTY" and sets "W-X1" in the value of the x coordinate. Also, step S117 sets "W-X2" in the value of the x coordinate of the start point for "STARTY". When no x coordinate of the start point is found. "W-X1" and "W-X2" are set equal to the value "0".

After the step S117 is performed, step S118 detects whether both "W-X1" and "W-X2" are equal to the value "0".

When the result at step S118 is negative, step S119 detects whether the value of "W-X1" is smaller than the value "W-X2". When the result at step S119 is negative, step S120 sets "STARTX" in the value of "W-X1" and sets "ENDX" in the value of "W-X2". On the other hand, when the result at step S119 is affirmative, step S122 sets "ENDX" in the value of "W-X1" and sets "STARTX" in the value of "W-X2".

After either the step S120 or the step S122 is performed, step S121 erases the data of the rectangular portion whose parameters are determined, from the data of the original image. After the step S121 is performed, the above step S117 is performed again.

When the result at step S118 is affirmative, step S123 detects whether the value of "W-Ymax" is equal to "0".

When the result at step S123 is negative, step S124 sets "STARTY" in the value of "W-Ymax". After the step S124 is performed, the above step S116 is performed again.

When the result at step S123 is affirmative, the above step S113 shown in FIG. 47B is performed again.

Figure 48:
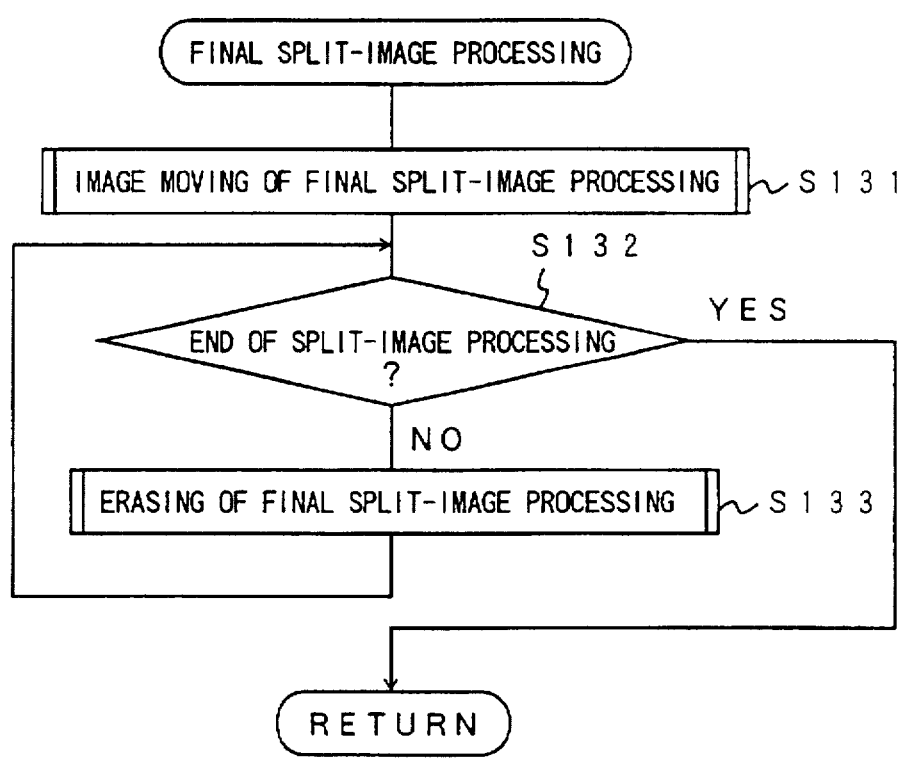
FIG. 48 is a flow chart for explaining a final split-image processing procedure.

FIG. 48 shows a final split-image processing procedure which corresponds to the step S5 in the split image generating process in FIG. 38.

Figure 49:
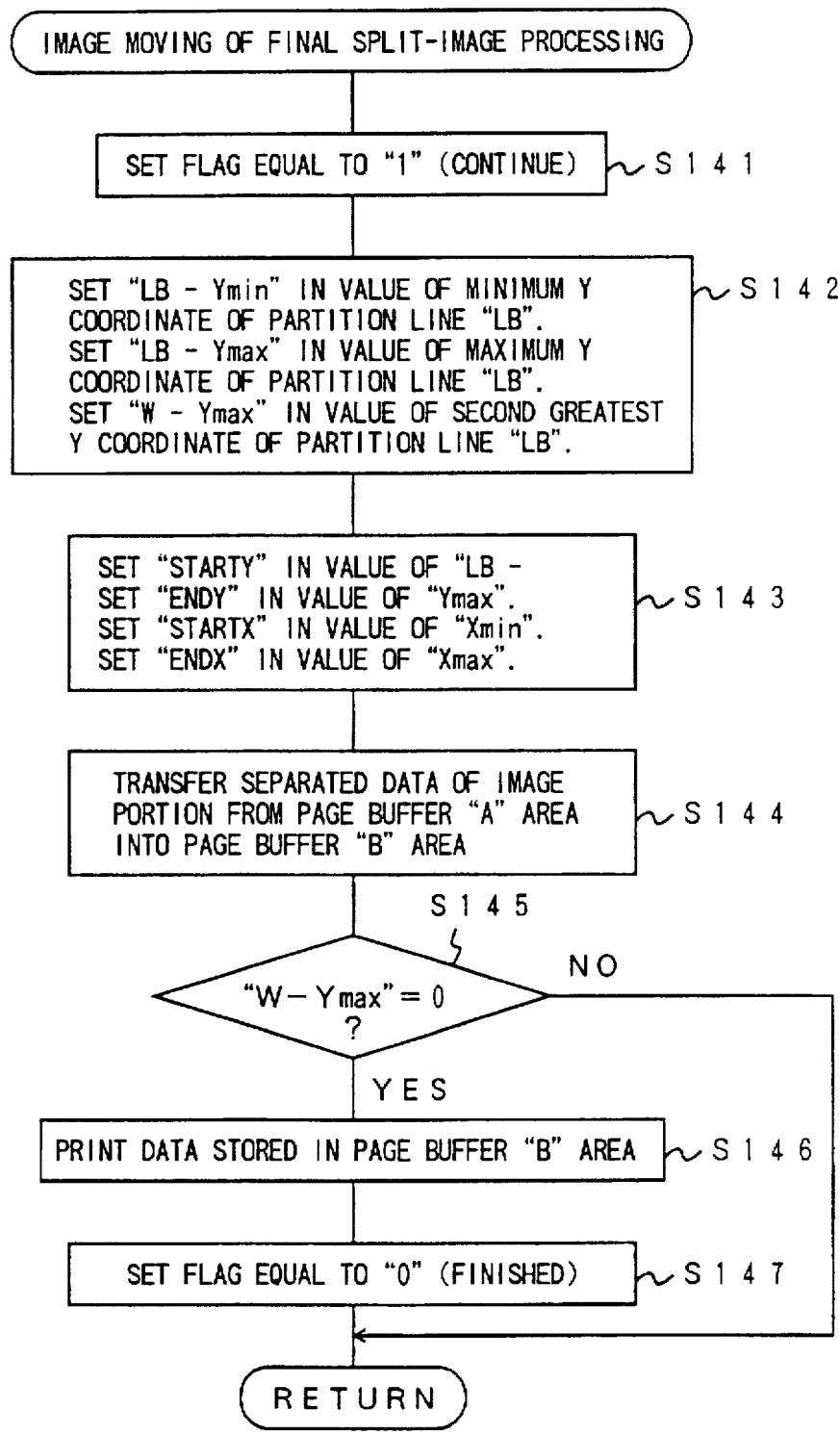
FIG. 49 is a flow chart for explaining an image moving step of the final split-image processing procedure.

In FIG. 48, step S131 performs an image moving procedure of the final split-image processing procedure (see FIG. 49). After the step S131 is performed, step S132 detects whether an end of the split-image processing has been found.

When the result at step S132 is affirmative, the final split-image processing procedure ends. Thus, the split image generating procedure in FIG. 38 is finished.

Figure 50:
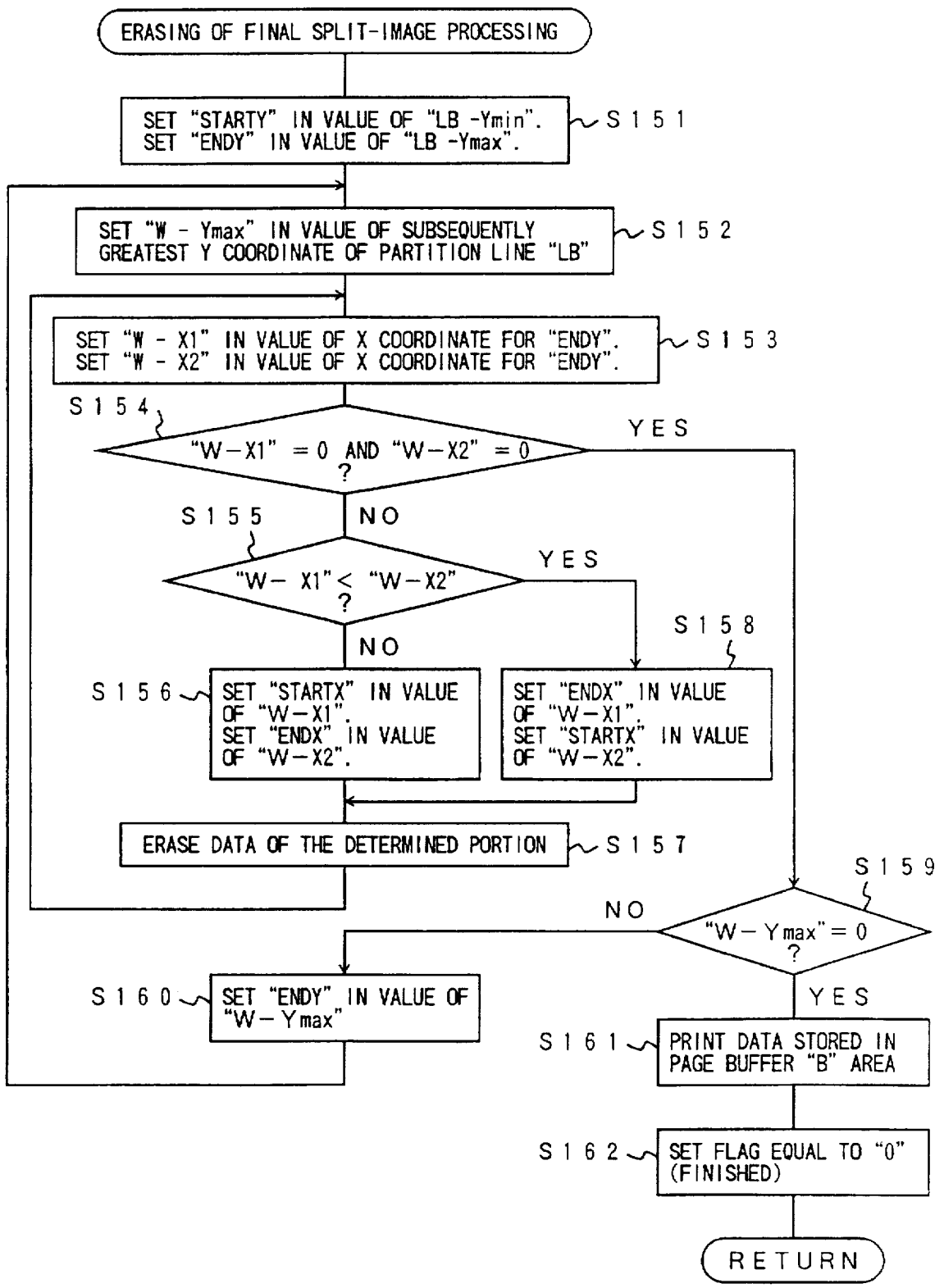
FIG. 50 is a flow chart for explaining an erasing step of the final split-image processing procedure.

When the result at step S132 is negative, step S133 performs an erasing procedure of the final split-image processing procedure (see FIG. 50). After the step S133 is performed, the above step S132 is performed again.

FIG. 49 shows an image moving procedure which corresponds to the step S131 in the final split-image processing procedure in FIG. 48. By this image moving procedure, the original image from the page buffer "A" area 11 is divided into the image portions by the reference partition line, and separated data of a final image portion is transferred into the page buffer "B" area 12.

In FIG. 49, step S141 sets a flag equal to "1". The value "1" of this flag indicates that this image moving procedure continues to run.

Step S142 finds a minimum y coordinate of the splitting positions of the partition line LB, and sets "LB-Ymin" in the value of the minimum y coordinate. Step S142 finds a maximum y coordinate of the splitting positions of the partition line LB, and sets "LB-Ymax" in the value of the maximum y coordinate. Step S142 finds a second greatest y coordinate of the splitting positions of the partition line LB, and sets "W-Ymax" in the value of the second greatest y coordinate. When no second greatest y coordinate is found, "W-Ymax" is set in the value zero.

At step S143, the parameters of a rectangular image portion in which the final split-image is included are set.

"STARTY" is set in the value of "LB−Ymin", "ENDY" is set in the value of "Ymax", "STARTX" is set in the value of "Xmin", and "ENDX" is set in the value of "Xmax".

Step S144 separates the data of the final image portion whose parameters are set at step S143, from the data of the original image read from the page buffer "A" area 11, and transfers the separated data into the page buffer "B" area 12.

After the step S144 is performed, step S145 detects whether the value of "W−Ymax" is equal to "0".

When the result at step S145 is negative, the image moving procedure ends. Control is transferred to a following step in the final split-image processing procedure in FIG. 48.

When the result at step S145 is affirmative, step S146 prints the data (the final split image) stored in the page buffer "B" area 12. Step S147 sets the flag equal to "0". The value "0" of the flag indicates that the image moving procedure is finished. Control is transferred to the following step in the final split-image processing procedure in FIG. 48.

FIG. 50 shows an erasing procedure which corresponds to the step S133 in the final split-image processing procedure in FIG. 48. By this erasing procedure, data of the erased portions, bounded by the partition line and the reference partition line, is erased from the data of the final image portion stored in the page buffer "B" area, and the resulting data is printed on the recording sheet.

In FIG. 50, step S151 sets "STARTY" in the value of "LB−Ymin", and sets "ENDY" in the value of "LB−Ymax". Step S152 finds a subsequently greatest y coordinate of the splitting positions of the partition line "LB", and sets "W−Ymax" in the value of the subsequently greatest y coordinate. When no subsequently greatest y coordinate is found, "W−Ymax" is set equal to the value "0".

After the step S152 is performed, step S153 finds an x coordinate of the end point for "ENDY", and sets "W−X1" in the value of the x coordinate. Also, step S153 sets "W−X2" in the value of the x coordinate of the end point for "ENDY". When no x coordinate of the end point is found, "W−X1" and "W−X2" are set equal to the value "0".

After the step S153 is performed, step S154 detects whether both "W−X1" and "W−X2" are equal to the value "0".

When the result at step S154 is negative, step S155 detects whether the value of "W−X1" is smaller than the value "W−X2". When the result at step S155 is negative, step S156 sets "STARTX" in the value of "W−X1" and sets "ENDX" in the value of "W−X2". On the other hand, when the result at step S155 is affirmative, step S158 sets "ENDX" in the value of "W−X1" and sets "STARTX" in the value of "W−X2".

After either the step S156 or the step S158 is performed, step S157 erases the data of the rectangular portion whose parameters are thus determined, from the data of the original image. After the step S157 is performed, the above step S153 is performed again.

When the result at step S154 is affirmative, step S159 detects whether the value of "W−Ymax" is equal to "0".

When the result at step S159 is negative, step S160 sets "ENDY" in the value of "W−Ymax". After the step S160 is performed, the above step S152 is performed again.

When the result at step S159 is affirmative, step S161 prints data stored in the page buffer "B" area 12 on the recording sheet. After the step S161 is performed, step S162 sets the flag equal to "0". The value "0" of this flag indicates that the erasing procedure is finished. Control is transferred to a following step in the final split-image processing procedure in FIG. 48.

In the above-described embodiment, the case in which the subsequent split-image is a single page has been explained. When the original image is split into split images by three or more partition lines, two or more pages of subsequent split-images are generated. In such a case, each of the subsequent split-images can be correctly printed on the recording sheet by repeating the procedures of FIGS. 45 through 47C.

When each of the split images is printed on the recording sheet, it is desirable that the location of each split image printed on the recording sheet is specified and the printing is carried out. Also, when the split images are sequentially printed on the recording sheets, it is desirable that a serial page number is attached to each of the split images and the printing is carried out. These measures will allow the operator to more easily carry out the information retrieval.

Further, the present invention is not limited to the above-described embodiments, and variations and modifications may be made without departing from the scope of the present invention.

What is claimed is:

1. An electronic filing apparatus, comprising:

reading means for reading an image of a document;

storage means for storing the image read by said reading means;

display means for displaying the image stored in said storage means;

printing means for printing the image displayed by said displaying means on a recording sheet;

line setting means for setting a partition line within the displayed image in accordance with input data when the displayed image is greater in size than the recording sheet;

generating means for generating split images by splitting the displayed image in accordance with the partition line set by said line setting means to make each of said split images smaller in size than the recording sheet; and print control means for controlling said printing means to print each of the split images generated by said generating means on the recording sheet;

wherein said partition line is piecewise linear having line segments in an arbitrary configuration.

2. The electronic filing apparatus according to claim 1, wherein said partition line set by said line setting means comprises a plurality of line segments, respective positions of start and end points of each line segment being input by an operator on said display means.

3. The electronic filing apparatus according to claim 1, wherein said generating means sets a reference partition line based on the partition line set by said line setting means so that the displayed image is divided into image portions by the reference partition line.

4. The electronic filing apparatus according to claim 1, wherein said storage means includes at least a first page buffer and a second page buffer, the image read by the reading means being stored in said first page buffer, data of each of the split images generated by the generating means being stored in said second page buffer.

5. The electronic filing apparatus according to claim 1, wherein said storage means includes at least a first page buffer and a second page buffer, said generating means transfers data of each of the generated split images into said second page buffer, and said print control means controls the printing means to print each of the split images stored in said second page buffer on the recording sheet.

6. An electronic filing apparatus, comprising:

reading means for reading an image of a document;

storage means for storing the image read by said reading means;

display means for displaying the image stored in said storage means;

printing means for printing the image displayed by said displaying means on a recording sheet;

line setting means for setting a partition line made up of line segments within the displayed image in accordance with input data when the displayed image is greater in size than the recording sheet;

generating means for generating split images by splitting the displayed image in accordance with the partition line set by said line setting means to make each of said split images smaller in size than the recording sheet; and print control means for controlling said printing means to print each of the split images generated by said generating means on the recording sheet;

wherein said line setting means determines a length of each line segment of the partition line and detects whether the determined length is smaller than a length of the recording sheet.

7. An electronic filing apparatus, comprising:

reading means for reading an image of a document;

storage means for storing the image read by said reading means;

display means for displaying the image stored in said storage means;

printing means for printing the image displayed by said displaying means on a recording sheet;

line setting means for setting a partition line made up of line segments within the displayed image in accordance with input data when the displayed image is greater in size than the recording sheet;

generating means for generating split images by splitting the displayed image in accordance with the partition line set by said line setting means to make each of said split images smaller in size than the recording sheet; and print control means for controlling said printing means to print each of the split images generated by said generating means on the recording sheet;

wherein said generating means sets a reference partition line based on the partition line set by said line setting means so that the displayed image is divided into image portions by the reference partition line, said generating means sets a reference partition line in accordance with a maximum coordinate of the line segments of the partition line when a first split-image is generated from the displayed image, and said generating means sets a reference partition line in accordance with a minimum coordinate of the line segments of the partition line when a final split-image is generated from the displayed image.

8. An electronic filing apparatus, comprising:

reading means for reading an image of a document;

storage means for storing the image read by said reading means;

display means for displaying the image stored in said storage means;

printing means for printing the image displayed by said displaying means on a recording sheet;

line setting means for setting a partition line made up of line segments within the displayed image in accordance with input data when the displayed image is greater in size than the recording sheet;

generating means for generating split images by splitting the displayed image in accordance with the partition line set by said line setting means to make each of said split images smaller in size than the recording sheet; and print control means for controlling said printing means to print each of the split images generated by said generating means on the recording sheet;

wherein said generating means sets a reference partition line based on the partition line set by said line setting means so that the displayed image is divided into image portions by the reference partition line, and when said line setting means sets two or more partition lines and said generating means generates a subsequent split-image from the displayed image, said generating means sets two or more reference partition lines in accordance with maximum and minimum coordinates of line segments of each partition line.

9. An electronic filing apparatus, comprising:

reading means for reading an image of a document;

storage means for storing the image read by said reading means;

display means for displaying the image stored in said storage means;

printing means for printing the image displayed by said displaying means on a recording sheet;

line setting means for setting a partition line made up of line segments within the displayed image in accordance with input data when the displayed image is greater in size than the recording sheet;

generating means for generating split images by splitting the displayed image in accordance with the partition line set by said line setting means to make each of said split images smaller in size than the recording sheet; and print control means for controlling said printing means to print each of the split images generated by said generating means on the recording sheet;

wherein said generating means sets erased portions for each of image portions of the displayed image in accordance with the partition line and a reference partition line, said reference partition line being set in accordance with a maximum coordinate or a minimum coordinate of the line segments of the partition line, each of said erased portions being bounded by the partition line and said reference partition line.

10. An electronic filing apparatus, comprising:

reading means for reading an image of a document;

storage means for storing the image read by said reading means;

display means for displaying the image stored in said storage means;

printing means for printing the image displayed by said displaying means on a recording sheet;

line setting means for setting a partition line made up of line segments within the displayed image in accordance with input data when the displayed image is greater in size than the recording sheet;

generating means for generating split images by splitting the displayed image in accordance with the partition line set by said line setting means to make each of said split images smaller in size than the recording sheet; and print control means for controlling said printing means to print each of the split images generated by said generating means on the recording sheet;

wherein said generating means generates each of the split images by erasing data of erased portions from data of each split image, said erased portions being set in accordance with the segment lines of the partition line and a reference partition line, said reference partition line being set in accordance with a maximum coordinate or a minimum coordinate of the line segments of the partition line.

11. An electronic filing apparatus, comprising:

reading means for reading an image of a document;

storage means for storing the image read by said reading means;

display means for displaying the image stored in said storage means;

printing means for printing the image displayed by said displaying means on a output sheet;

line setting means for setting a partition line within the displayed image in accordance with input data;

generating means for generating split images by splitting the displayed image in accordance with the partition line set by said line setting means; and print control means for controlling said printing means to print each of the split images generated by said generating means on the output sheet;

wherein said partition line is piecewise linear having line segments in an arbitrary configuration.

* * * * *